US012763992B2

(12) United States Patent
Peng et al.

(10) Patent No.: US 12,763,992 B2
(45) Date of Patent: Oct. 13, 2026

(54) METHOD FOR FEEDING BACK SENSING MEASUREMENT RESULT BASED ON ULTRA WIDEBAND AND APPARATUS

(71) Applicant: HUAWEI TECHNOLOGIES CO., LTD., Shenzhen (CN)

(72) Inventors: Xiaohui Peng, Shenzhen (CN); Bin Qian, Shenzhen (CN); Yunbo Li, Shenzhen (CN); Kuan Wu, Shenzhen (CN); Xun Yang, Singapore (SG); Min Yan, Shenzhen (CN); Lei Huang, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/919,778

(22) Filed: Oct. 18, 2024

(65) Prior Publication Data

US 2025/0047527 A1 Feb. 6, 2025

Related U.S. Application Data

(63) Continuation of application No. PCT/CN2023/088830, filed on Apr. 18, 2023.

(30) Foreign Application Priority Data

Apr. 20, 2022 (CN) ......................... 202210418108.7
Dec. 28, 2022 (CN) ......................... 202211698165.1

(51) Int. Cl.
*H04L 25/02* (2006.01)
*H04B 17/24* (2015.01)

(52) U.S. Cl.
CPC ......... *H04L 25/0212* (2013.01); *H04B 17/24* (2015.01)

(58) Field of Classification Search
CPC ............................ H04L 25/0212; H04B 17/24
See application file for complete search history.

(56) References Cited

U.S. PATENT DOCUMENTS

2008/0165746 A1 7/2008 Sung et al.
2020/0191913 A1 6/2020 Zhang et al.
(Continued)

FOREIGN PATENT DOCUMENTS

CN 103517315 A 1/2014
CN 104168228 A 11/2014
(Continued)

OTHER PUBLICATIONS

IEEE Computer Society:"IEEE Standard for Information technology—Telecommunications and information exchange between systems—Local and metropolitan area networks—Specific requirements." IEEE 3 Park Avenue New York, NY 10016-5997, USA IEEE Std 802.15.4a™-2007. Aug. 31, 2007. total 203 pages.
(Continued)

*Primary Examiner* — Janice N Tieu
(74) *Attorney, Agent, or Firm* — WOMBLE BOND DICKINSON (US) LLP

(57) ABSTRACT

A method for feeding back a sensing measurement result based on UWB and an apparatus are applied to a UWB-based WPAN system, for example, the 802.15.4a protocol, the 802.15.4z protocol, or the 802.15.4ab protocol in 802.15 series protocols, or may be applied to a wireless local area network system, a sensing system, or the like in 802.11 series protocols such as a next-generation Wi-Fi protocol of IEEE 802.11ax, for example, 802.11be, Wi-Fi 7, or EHT, and a next generation protocol of 802.11be, for example, Wi-Fi 8. The method includes: A transmitter sends control information; and correspondingly, a receiver receives the control information. Then, the receiver sends feedback information, and correspondingly, the transmitter receives
(Continued)

the feedback information. According to the technical solutions provided in this application, signaling overheads can be effectively reduced.

18 Claims, 14 Drawing Sheets

(56) References Cited

U.S. PATENT DOCUMENTS

| | | | |
|---|---|---|---|
| 2021/0175949 A1 | 6/2021 | Ahmed et al. | |
| 2021/0195632 A1 | 6/2021 | Jungnickel et al. | |
| 2024/0183936 A1* | 6/2024 | Au | H04L 67/12 |
| 2024/0324033 A1* | 9/2024 | Gao | H04W 76/10 |

FOREIGN PATENT DOCUMENTS

| | | | |
|---|---|---|---|
| CN | 105960017 | A | 9/2016 |
| CN | 111951434 | A | 11/2020 |
| CN | 114071534 | A | 2/2022 |
| RU | 2767777 | C2 | 3/2022 |
| WO | 2019138156 | A1 | 7/2019 |
| WO | 2020030848 | A1 | 2/2020 |
| WO | 2020064111 | A1 | 4/2020 |
| WO | 2022006757 | A1 | 1/2022 |

OTHER PUBLICATIONS

IEEE Computer Society:"IEEE Standard for Low-Rate Wireless Networks Amendment 1: Enhanced Ultra Wideband (UWB) Physical Layers (PHYs) and Associated Ranging Techniques." IEEE Std 802.15.4z™-2020. Aug. 25, 2020. total 174 pages.

Xiaohui Peng et al:"CIR feedback for UWB sensing." doc. IEEE 15-21-0570-00-04ab. Nov. 2021. total 13 pages.

Frank Leong et al:"Sensing—Continued." doc.: 15-22-0061-00-04ab>. Jan. 2022. total 13 pages.

Bin Qian et al:"CIR feedback scheme for UWB sensing." doc. IEEE 15-22-0155-00-04ab. Mar. 2022. total 24 pages.

Dag T. Wisland (Novelda AS) et al:"Sensing Device." doc.: 15-22-0175-00-04ab>. Mar. 2022. total 16 pages.

Yingxiang Sun et al. Threshold based sensing measurement, IEEE 802.11-21/0351r2, Mar. 9, 2021, total 14 pages.

Pooria Pakrooh et al. Link budget analysis and CIR reporting for UWB RF sensing, Project: IEEE P802.15 Working Group for Wireless Specialty Networks (WSN), IEEE 802.15-22-0066-01-04ab, Jan. 21, 2022, total 20 pages.

IEEE P802.11be/D0.Sep. 1, 2020. Draft Standard for Information technology—Telecommunications and information exchange between systems Local and metropolitan area networks—Specific requirements. Part 11: Wireless LAN Medium Access Control (MAC) and Physical Layer (PHY) Specifications. Amendment 8: Enhancements for extremely high throughput (EHT). total 299 pages.

* cited by examiner

METHOD FOR FEEDING BACK SENSING MEASUREMENT RESULT BASED ON ULTRA WIDEBAND AND APPARATUS

CROSS-REFERENCE TO RELATED APPLICATIONS

This application is a continuation of International Application No. PCT/CN2023/088830, filed on Apr. 18, 2023, which claims priority to Chinese Patent Application No. 202210418108.7, filed on Apr. 20, 2022 and Chinese Patent Application No. 202211698165.1, filed on Dec. 28, 2022. All of the afore-mentioned patent applications are hereby incorporated by reference in their entireties.

TECHNICAL FIELD

This application relates to the field of communication technologies, and in particular, to a method for feeding back a sensing measurement result based on ultra wideband and an apparatus.

BACKGROUND

Ultra wideband (UWB) is a wireless carrier communication technology, and may transmit data through nanosecond-level non-sinusoidal narrow impulses. Therefore, ultra wideband occupies a wide spectrum range. Because of a narrow pulse and low radiation spectrum density of UWB, UWB has advantages such as a strong multi-path resolution capability, low power consumption, and high confidentiality.

Based on the characteristics of UWB, a UWB pulse can be used for sensing. In a sensing application, information related to a target, for example, a distance, an angle, or a speed, can be extracted by detecting an echo of a UWB signal on the target. In a sensing application scenario, a sensing initiator is a transmitter of a UWB signal, and a sensing responder is a receiver of a UWB echo signal. If the sensing initiator needs to obtain a sensing measurement result, the sensing responder needs to feed back the sensing measurement result to the sensing initiator. For example, the sensing responder may feed back all sensing measurement results to the sensing initiator.

However, signaling overheads of the foregoing feedback manner may be further reduced.

SUMMARY

This application provides a method for feeding back a sensing measurement result based on UWB, to effectively reduce signaling overheads.

According to a first aspect, an embodiment of this application provides a method for feeding back a sensing measurement result based on ultra wideband. The method includes:

sending control information, where the control information includes first control information, and the first control information indicates to feed back a sensing measurement result in a threshold-based feedback manner; and receiving feedback information, where the feedback information includes channel impulsive response (CIR) parameter information, and the CIR parameter information is obtained by processing the sensing measurement result based on the first control information.

According to a second aspect, an embodiment of this application provides a method for feeding back a sensing measurement result based on ultra wideband. The method includes:

receiving control information, where the control information includes first control information, and the first control information indicates to feed back a sensing measurement result in a threshold-based feedback manner; and sending feedback information, where the feedback information includes channel impulsive response CIR parameter information, and the CIR parameter information is obtained by processing the sensing measurement result based on the first control information.

In embodiments of this application, a transmitter sends control information to a receiver, so that the receiver can process an original CIR parameter based on the control information, for example, obtain CIR parameter information in a threshold-based feedback manner. In other words, the CIR parameter information is obtained in the threshold-based feedback manner. A sensing measurement result is processed (for example, processed in the threshold-based feedback manner) to obtain the CIR parameter information, and then the CIR parameter information is fed back, to effectively reduce signaling overheads. In addition, the receiver performs processing based on the control information sent by the transmitter, and then the receiver sends feedback information. This effectively improves a UWB pulse-based sensing procedure and ensures communication efficiency of both communication parties.

In an embodiment, the first control information includes information about a first threshold, and the first threshold is used to determine, based on a sensing measurement result in a reference sampling unit, whether to feed back a sensing measurement result in one or more non-reference sampling units.

In an embodiment, the first threshold is used to determine, based on the sensing measurement result in the reference sampling unit, whether to feed back one or more groups of sensing measurement results in each of the one or more non-reference sampling units.

In an embodiment, a value of the first threshold is in direct proportion to a radar cross section (radar cross section, RCS) of a target.

In embodiments of this application, the value of the first threshold is updated based on the RCS of the target without affecting obtaining of information related to the target by the transmitter. This effectively reduces signaling overheads of the CIR parameter information. For example, when the transmitter does not obtain the RCS of the target, the value of the first threshold may be set to a small value, for example, a low threshold or a lower threshold, so that the receiver can feed back the sensing measurement result in a more comprehensive and detailed manner. When the transmitter finds, based on the obtained sensing measurement result, that the RCS of the target is greater than a specific threshold, the first threshold may be set to a large value, for example, a value greater than the low threshold or the lower threshold. Because the value of the first threshold is larger, sensing measurement results of some non-reference sampling units may not need to be fed back. This effectively reduces the signaling overheads of the CIR parameter information. Correspondingly, after the transmitter receives the feedback information, even if the sensing measurement results of the some non-reference sampling units are not fed back, the transmitter may still use the sensing measurement result in the reference sampling unit as the sensing measurement result that is in the non-reference sampling unit and that is not fed back.

In an embodiment, the first control information further includes information about a compression mode, and the compression mode includes any one of the following: no compression, a compression mode in which a fixed quantity of sampling points are used as a unit (a compression mode in which a fixed quantity of taps are used as a unit), and a compression mode in which a variable quantity of sampling points are used as a unit (a compression mode in which a variable quantity of taps are used as a unit).

For example, no compression means that the sensing measurement result is directly fed back by using a tap obtained through sampling, and does not need to be determined based on the first threshold. The compression mode in which a fixed quantity of taps are used as a unit or a variable quantity of taps are used as a unit means that one or more taps obtained through sampling may be classified into one group, and then whether to feed back a sensing measurement result in a group is determined based on the first threshold.

In embodiments of this application, in the compression mode in which a fixed quantity of sampling points are used as a unit, the method is easy to implement, and the transmitter is not affected to obtain the information related to the target. This can effectively reduce signaling overheads of the CIR parameter. In the compression mode in which a variable quantity of sampling points are used as a unit, the receiver has a higher degree of freedom to perform compression processing, and the transmitter is not affected to obtain the information related to the target. This can effectively reduce signaling overheads of the CIR parameter.

In an embodiment, the first control information further includes address information of a communication apparatus that receives the control information.

In embodiments of this application, the first control information includes address information of one or more receivers, so that each receiver can clearly learn the control information, and each receiver processes a sensing measurement result based on the control information, to feed back a sensing measurement result obtained by each receiver. This effectively improves communication efficiency.

In an embodiment, the feedback information further includes information related to the CIR parameter information, and the information related to the CIR parameter information includes at least one of the following: a quantity of sampling units corresponding to the CIR parameter information, a quantity of sampling points included in each sampling unit, a quantity of antennas used for measuring the sensing measurement result, and information indicating whether a sensing measurement result in a reference sampling unit is stored.

In embodiments of this application, the feedback information includes the foregoing information, so that the transmitter can clearly learn a manner of parsing the CIR parameter information. This improves communication efficiency of both communication parties.

In an embodiment, when the compression mode includes the compression mode in which a variable quantity of sampling points are used as a unit, the feedback information further includes the following information: a quantity of groups in one sampling unit, and a start sampling point and an end sampling point in each group. Alternatively, the feedback information further includes the following information: a quantity of groups in one sampling unit, a start sampling point in each group, and a quantity of sampling points.

In embodiments of this application, the feedback information includes the foregoing information, so that when obtaining the feedback information, the transmitter can clearly learn grouping information of the sensing measurement result of the receiver, to quickly restore the original CIR parameter.

In an embodiment, the feedback information further includes information about a first bitmap, and each bit in the first bitmap indicates whether to feed back a sensing measurement result in a corresponding group.

In an embodiment, the CIR parameter information includes at least one piece of the following information: a path loss, a delay, an azimuth angle of arrival (azimuth angle of arrival, AOA), or a zenith angle of arrival (zenith angle of arrival, ZOA).

In an embodiment, the feedback information further includes a data mode indicating path loss information, and the data mode includes at least one of a data mode based on an amplitude and a phase or a data mode based on an in-phase component and a quadrature component.

In embodiments of this application, the data mode indicating the path loss information is used, so that forms of the path loss information are more diversified, and different feedback forms of sensing information can be effectively selected for different application scenarios. For example, when a bit width (namely, an occupied bit length) of the path loss information is small, precision of feeding back based on the amplitude and the phase is higher.

In an embodiment, the method further includes: grouping sensing measurement results in a unit of a fixed quantity of sampling points or a variable quantity of sampling points, to obtain one or more groups of sensing measurement results; and when a difference between a sensing measurement result in a group and a sensing measurement result of a same delay in a reference sampling unit is less than or equal to a first threshold, determining not to feed back the sensing measurement result in the group; or when a difference between a sensing measurement result in a group and a sensing measurement result of a same delay in a reference sampling unit is greater than a first threshold, determining to feed back the sensing measurement result in the group, and feeding back the sensing measurement result in the group by using the difference.

According to a third aspect, an embodiment of this application provides a communication apparatus, configured to implement the method according to any one of the first aspect or the possible implementations of the first aspect. The communication apparatus includes units that perform the method according to any one of the first aspect or the possible implementations of the first aspect.

According to a fourth aspect, an embodiment of this application provides a communication apparatus, configured to perform the method according to any one of the second aspect or the possible implementations of the second aspect. The communication apparatus includes units that perform the method according to any one of the second aspect or the possible implementations of the second aspect.

In embodiments of the third aspect or the fourth aspect, the communication apparatus may include a transceiver unit and a processing unit. For specific descriptions of the transceiver unit and the processing unit, refer to the apparatus embodiments provided below.

According to a fifth aspect, an embodiment of this application provides a communication apparatus. The communication apparatus includes a processor, configured to perform the method according to any one of the first aspect or the possible implementations of the first aspect. Alternatively, the processor is configured to execute a program stored in a memory. When the program is executed, the method according to any one of the first aspect or the possible implementations of the first aspect is performed.

In an embodiment, the memory is located outside the communication apparatus.

In an embodiment, the memory is located inside the communication apparatus.

In this embodiment of this application, the processor and the memory may alternatively be integrated into one device. In other words, the processor and the memory may alternatively be integrated together.

In an embodiment, the communication apparatus further includes a transceiver. The transceiver is configured to receive a signal or send a signal.

According to a sixth aspect, an embodiment of this application provides a communication apparatus. The communication apparatus includes a processor, configured to perform the method according to any one of the second aspect or the possible implementations of the second aspect. Alternatively, the processor is configured to execute a program stored in a memory. When the program is executed, the method according to any one of the second aspect or the possible implementations of the second aspect is performed.

In an embodiment, the memory is located outside the communication apparatus.

In an embodiment, the memory is located inside the communication apparatus.

In this embodiment of this application, the processor and the memory may alternatively be integrated into one device. In other words, the processor and the memory may alternatively be integrated together.

In an embodiment, the communication apparatus further includes a transceiver. The transceiver is configured to receive a signal or send a signal.

According to a seventh aspect, an embodiment of this application provides a communication apparatus. The communication apparatus includes a logic circuit and an interface, the logic circuit is coupled to the interface, and the logic circuit is configured to output control information and input feedback information through the interface.

It may be understood that the logic circuit is further configured to perform processing based on the feedback information, to obtain information related to a target. For example, the information related to the target includes information such as a speed, an angle, or attenuation.

According to an eighth aspect, an embodiment of this application provides a communication apparatus. The communication apparatus includes a logic circuit and an interface, the logic circuit is coupled to the interface, and the logic circuit is configured to input control information and output feedback information through the interface.

It may be understood that the logic circuit is further configured to determine the feedback information based on the control information.

According to a ninth aspect, an embodiment of this application provides a computer-readable storage medium. The computer-readable storage medium is configured to store a computer program, and when the computer program is run on a computer, the method according to any one of the first aspect or the possible implementations of the first aspect is performed.

According to a tenth aspect, an embodiment of this application provides a computer-readable storage medium. The computer-readable storage medium is configured to store a computer program, and when the computer program is run on a computer, the method according to any one of the second aspect or the possible implementations of the second aspect is performed.

According to an eleventh aspect, an embodiment of this application provides a computer program product. The computer program product includes a computer program or computer code, and when the computer program product runs on a computer, the method according to any one of the first aspect or the possible implementations of the first aspect is performed.

According to a twelfth aspect, an embodiment of this application provides a computer program product. The computer program product includes a computer program or computer code, and when the computer program product runs on a computer, the method according to any one of the second aspect or the possible implementations of the second aspect is performed.

According to a thirteenth aspect, an embodiment of this application provides a computer program. When the computer program is run on a computer, the method according to any one of the first aspect or the possible implementations of the first aspect is performed.

According to a fourteenth aspect, an embodiment of this application provides a computer program. When the computer program is run on a computer, the method according to any one of the second aspect or the possible implementations of the second aspect is performed.

According to a fifteenth aspect, an embodiment of this application provides a wireless communication system. The wireless communication system includes a transmitter and a receiver. The transmitter is configured to perform the method according to any one of the first aspect or the possible implementations of the first aspect, and the receiver is configured to perform the method according to any one of the second aspect or the possible implementations of the second aspect.

For technical effects achieved in the third aspect to the fifteenth aspect, refer to the technical effects of the first aspect or the second aspect or beneficial effects in the following method embodiments. Details are not described herein.

DESCRIPTION OF EMBODIMENTS

Figure 1A:
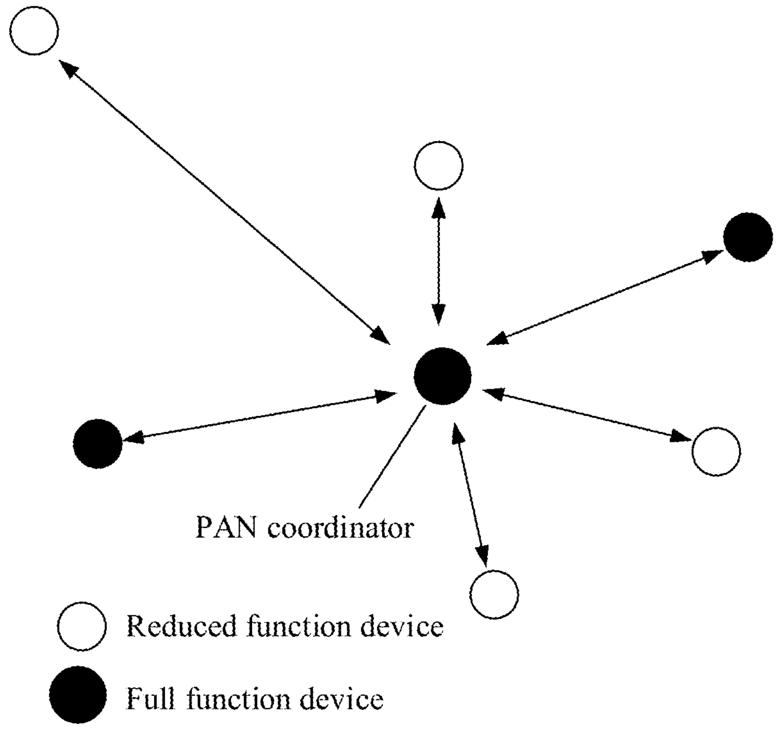
FIG. 1*a* is a diagram of an architecture of a communication system according to an embodiment of this application.

To make objectives, technical solutions, and advantages of this application clearer, this application is further described with reference to the accompanying drawings.

Terms "first", "second", and the like in the specification, claims, and accompanying drawings of this application are merely used to distinguish between different objects, and are not used to describe a specific order. In addition, terms such as "include" and "have" and any other variants thereof are intended to cover a non-exclusive inclusion. For example, processes, methods, systems, products, or devices that include a series of steps or units are not limited to listed steps or units, but instead, optionally further include steps or units that are not listed, or optionally further include other steps or units inherent to these processes, methods, products, or devices.

"Embodiments" mentioned in this specification mean that specific features, structures, or characteristics described in combination with the embodiments may be included in at least one embodiment of this application. The phrase shown in various positions in the specification does not necessarily refer to a same embodiment, and is not an independent or optional embodiment exclusive from another embodiment. It may be understood explicitly and implicitly by a person skilled in the art that embodiments described herein may be combined with other embodiments.

In this application, "at least one (item)" means one or more, "a plurality of" means two or more, "at least two (items)" means two or three or more, and "and/or" is used to describe an association relationship between associated objects, and indicates that three relationships may exist. For example, "A and/or B" may indicate: only A exists, only B exists, and both A and B exist. A and B may be singular or plural. The character "/" generally indicates an "or" relationship between the associated objects. "At least one of the following items (pieces)" or a similar expression thereof means any combination of these items. For example, at least one of a, b, or c may represent: a, b, c, "a and b", "a and c", "b and c", or "a, b, and c".

The technical solutions provided in this application are applicable to a UWB-based wireless personal area network (WPAN). For example, a method provided in this application is applicable to institute of electrical and electronics engineers (institute of electrical and electronics engineers, IEEE) 802.15 series protocols, for example, the 802.15.4a protocol, the 802.15.4z protocol, the 802.15.4ab protocol, or a future generation of UWB WPAN standard. Examples are not enumerated herein. The method provided in this application may be further applied to various communication systems, for example, an Internet of things (IoT) system, vehicle to X (V2X), and a narrowband Internet of things (narrowband Internet of things, NB-IoT) system, and is applied to a device in vehicle to X, an Internet of things node, a sensor, and the like in the Internet of things (IoT), a smart camera, a smart remote control, and a smart water meter in a smart home, a sensor in a smart city, and the like. The method provided in this application is also applicable to an LTE frequency division duplex (FDD) system, an LTE time division duplex (TDD) system, a universal mobile telecommunications system (UMTS), a worldwide interoperability for microwave access (WiMAX) communication system, a long term evolution (LTE) system, a 5th-generation (5G) communication system, a 6th-generation (6G) communication system, or the like.

UWB is a new wireless communication technology, and transmits data through nanosecond-level non-sinusoidal narrow impulses. Modulation is performed on impulses with very steep rise and fall time, and therefore, UWB occupies a wide spectrum range, so that a signal has a bandwidth of a Giga Hertz (GHz) magnitude. A bandwidth used by UWB is generally above 1 GHz. A UWB system does not need to generate a sinusoidal carrier signal and can directly transmit an impulse sequence. Therefore, the UWB system has a wide spectrum and low average power. A UWB wireless communication system has advantages such as a strong multi-path resolution capability, low power consumption, and high confidentiality. This facilitates coexistence with other systems, thereby improving spectrum utilization and system capacity. In addition, in a short-range communication application, transmit power of a UWB transmitter may be generally lower than 1 mW (milliwatt). Theoretically, interference generated by a UWB signal is equivalent to white noise with one broadband only. This facilitates good coexistence between ultra wideband and existing narrowband communication. Therefore, the UWB system and a narrowband (NB) communication system can simultaneously operate without interfering with each other. The method provided in this application may be implemented by a communication apparatus in a wireless communication system. In a communication apparatus, a module that implements a UWB system function may be referred to as a UWB module (for example, may be configured to send a UWB pulse), and a module that implements a narrowband communication system function may be referred to as a narrowband communication module. The UWB module and the narrowband communication module may be different apparatuses, chips, or the like. This is not limited in embodiments of this application. Certainly, the UWB module and the narrowband communication module may alternatively be integrated into one apparatus or chip. Implementations of the UWB module and the narrowband communication module in the communication apparatus are not limited in embodiments of this application.

Embodiments of this application are mainly described by using a WPAN as an example, and in particular, by using a network used in IEEE 802.15 series standards as an example. However, a person skilled in the art easily understands that, various aspects in this application may be extended to another network using various standards or protocols, for example, a wireless local area network (WLAN), Bluetooth (Bluetooth), a high performance radio LAN (HIPERLAN) (a wireless standard similar to the IEEE 802.11 standard, mainly used in Europe), a wide area network (WAN), or another network that is currently known or developed in the future. Therefore, regardless of used coverage and a used wireless access protocol, various aspects provided in this application are applicable to any appropriate wireless network.

The method provided in this application may be implemented by a communication apparatus in a wireless communication system. The communication apparatus may be an apparatus in a UWB system. For example, the communication apparatus may include but is not limited to a communication server, a router, a switch, a bridge, a computer, a mobile phone, and the like. For another example, the communication apparatus may include a central control point, for example, a personal area network (PAN) or a PAN coordinator. For another example, the communication apparatus may include user equipment (UE). The user equipment may include various handheld devices, vehicle-mounted devices, wearable devices, Internet of things (IoT) devices, computing devices, other processing devices connected to a wireless modem, or the like that have a wireless communication function. Examples are not enumerated herein. For another example, the communication apparatus may include a chip, and the chip may be disposed in a communication server, a router, a switch, a user terminal, or the like. Examples are not enumerated herein.

Figure 1B:
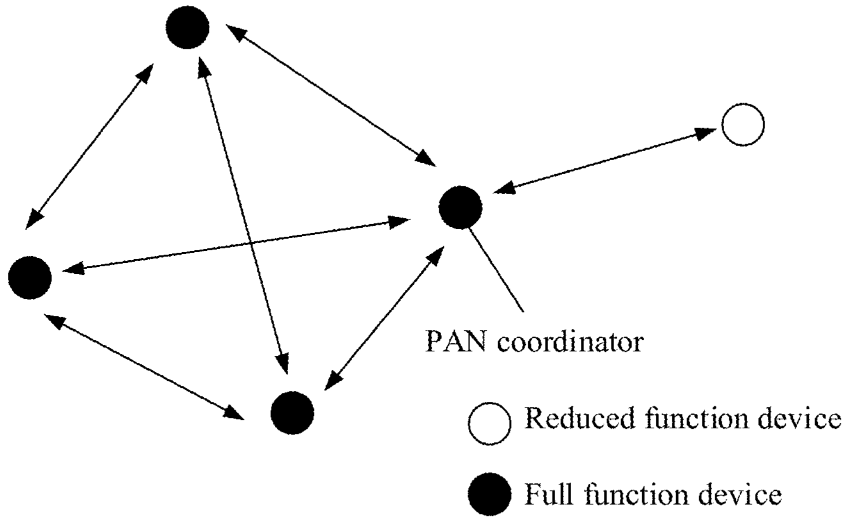
FIG. 1*b* is a diagram of an architecture of a communication system according to an embodiment of this application.

For example, FIG. 1*a* and FIG. 1*b* are diagrams of an architecture of a communication system according to an embodiment of this application. FIG. 1*a* shows a star topology structure according to an embodiment of this application, and FIG. 1*b* shows a point-to-point topology structure according to an embodiment of this application. As shown in FIG. 1*a*, in the star topology, one central control node may perform data communication with one or more other devices. As shown in FIG. 1*b*, in the point-to-point topology structure, data communication may be performed between different devices. In FIG. 1*a* and FIG. 1*b*, both a full function device (full function device) and a reduced function device (reduced function device) may be understood as communication apparatuses shown in this application. The full function device and the reduced function device are relative to each other. For example, the reduced function device cannot be a PAN coordinator (coordinator). For another example, compared with the full function device, the reduced function device may have no coordination capability or have a lower communication rate than the full function device. It may be understood that the PAN coordinator shown in FIG. 1*b* is merely an example, and the other three full function devices shown in FIG. 1*b* may also be used as PAN coordinators, which are not shown one by one herein.

It may be understood that, the full function device and the reduced function device shown in this application are merely examples of the communication apparatus, and any communication apparatus that can implement a method for feeding back a sensing measurement result based on UWB provided in this application falls within the protection scope of this application. A sensing initiator, a sensing responder, and the like shown below may be full function devices, or may be reduced function devices. This is not limited in this application.

For example, the communication apparatus shown in embodiments of this application may include a sensing initiator (initiator), a sensing responder (responder), or a sensing requestor (or referred to as a sensing requesting device (requesting device)). The sensing initiator and the sensing responder are relative to each other. For example, if the sensing initiator is a party that initiates a sensing procedure, the sensing responder may be a party that responds to the party that initiates the sensing procedure. For example, the sensing initiator may be a transmitter of a UWB signal, and the sensing responder is a receiver of a UWB echo signal. For another example, the sensing initiator may be a receiver of a UWB echo signal, and the sensing responder is a transmitter of a UWB signal. The sensing requestor may be understood as a party that initiates a sensing request to the sensing initiator. It may be understood that, because the UWB signal sent by the sensing initiator needs to first arrive at a target, and then arrive at the sensing responder (for example, the UWB signal arrives at the sensing responder after being reflected or scattered by the target), for the UWB signal sent by the sensing initiator, a signal received by the sensing responder may be referred to as the UWB echo signal. It may be understood that, for ease of description, the UWB signal and the UWB echo signal may alternatively be collectively referred to as a UWB signal below, and are not distinguished. The UWB signal shown in this application may alternatively be referred to as a sensing signal, a UWB pulse, or the like. It may be understood that one sensing packet shown below may include one or more UWB pulses (or UWB signals).

Based on the sensing initiator, the sensing responder, and the sensing requestor shown above, embodiments of this application provide the following six scenarios. It may be understood that FIG. 2*a* and FIG. 2*b* may be understood as sensing scenarios based on one sensing responder, for example, referred to as bi-static sensing (bi-static sensing). FIG. 2*c* and FIG. 2*d* may be understood as sensing scenarios based on a plurality of sensing responders, for example, referred to as multi-static sensing (multi-static sensing). In addition, in FIG. 2*a* and FIG. 2*c*, a sensing initiator is a receiver of a UWB echo signal, and s sensing responder is a transmitter of a UWB signal. In FIG. 2*b* and FIG. 2*d*, a sensing initiator is a transmitter of a UWB signal, and a sensing responder is a receiver of a UWB echo signal. FIG. 2*e* and FIG. 2*f* may be understood as sensing scenarios based on participation of a sensing initiator, a sensing responder, and a sensing requestor, for example, referred to as sensing by proxy (sensing by proxy).

Figure 2A:
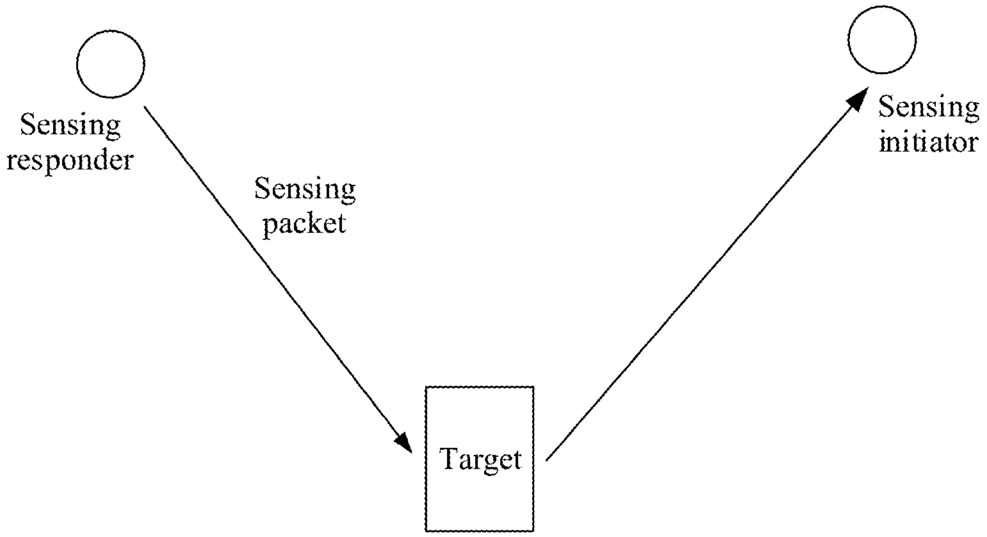
FIG. 2*a* is a diagram of a sensing scenario based on one sensing responder according to an embodiment of this application.
Figure 2B:
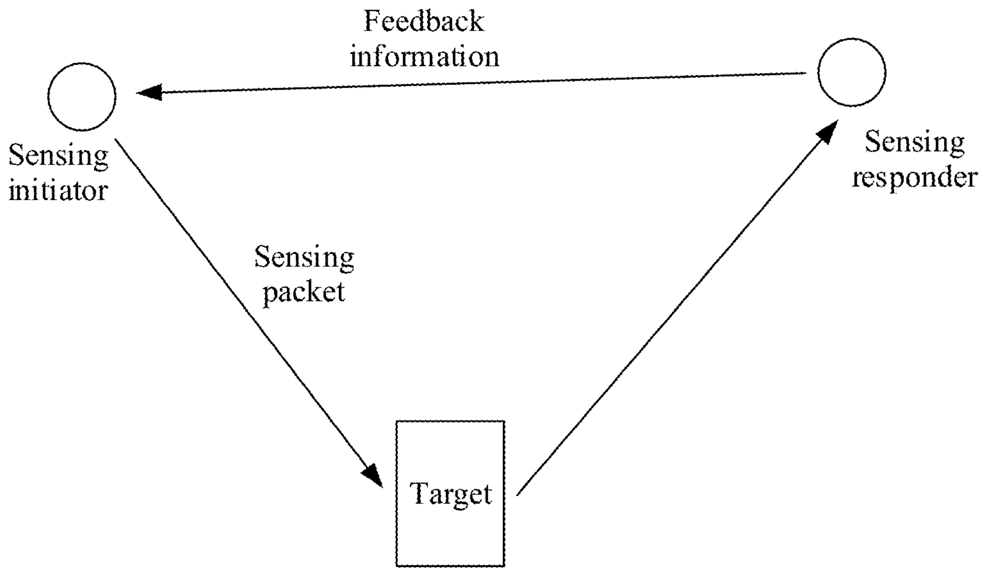
FIG. 2*b* is a diagram of a sensing scenario based on one sensing responder according to an embodiment of this application.
Figure 2C:
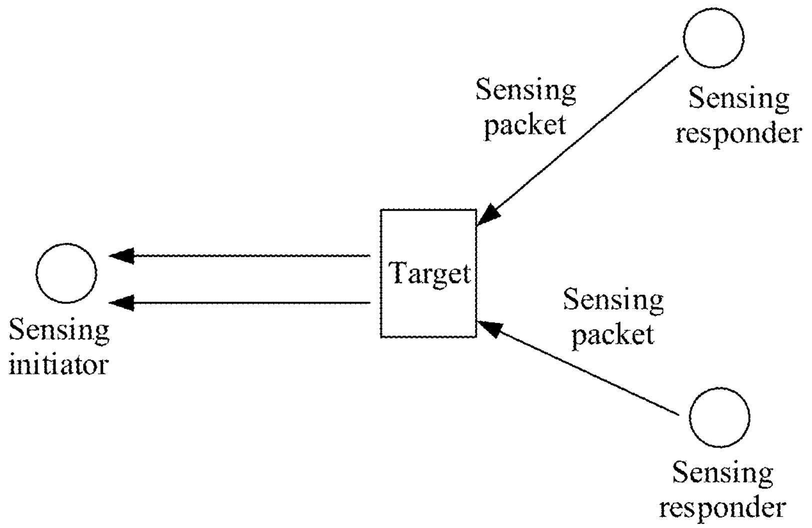
FIG. 2*c* is a diagram of a sensing scenario based on a plurality of sensing responders according to an embodiment of this application.
Figure 2D:
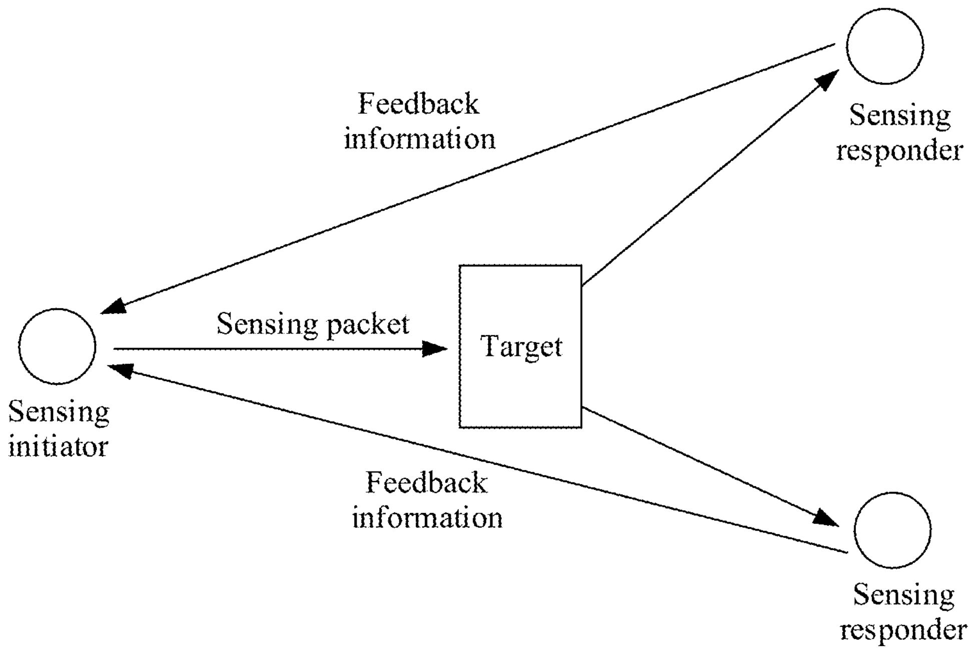
FIG. 2*d* is a diagram of a sensing scenario based on a plurality of sensing responders according to an embodiment of this application.
Figure 2E:
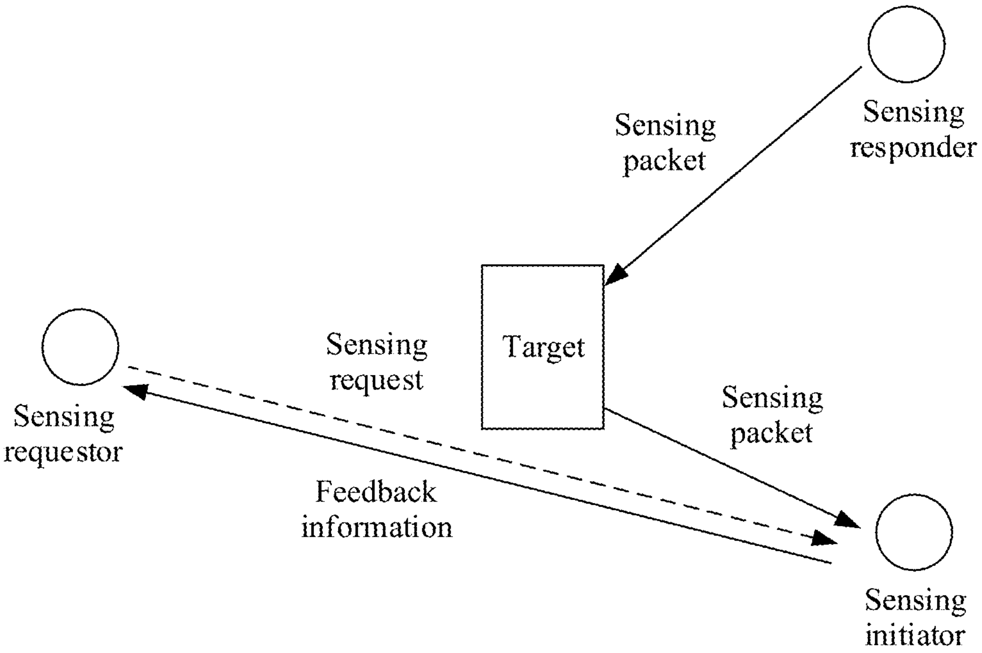
FIG. 2*e* is a diagram of a sensing scenario based on a sensing requestor according to an embodiment of this application.
Figure 2F:
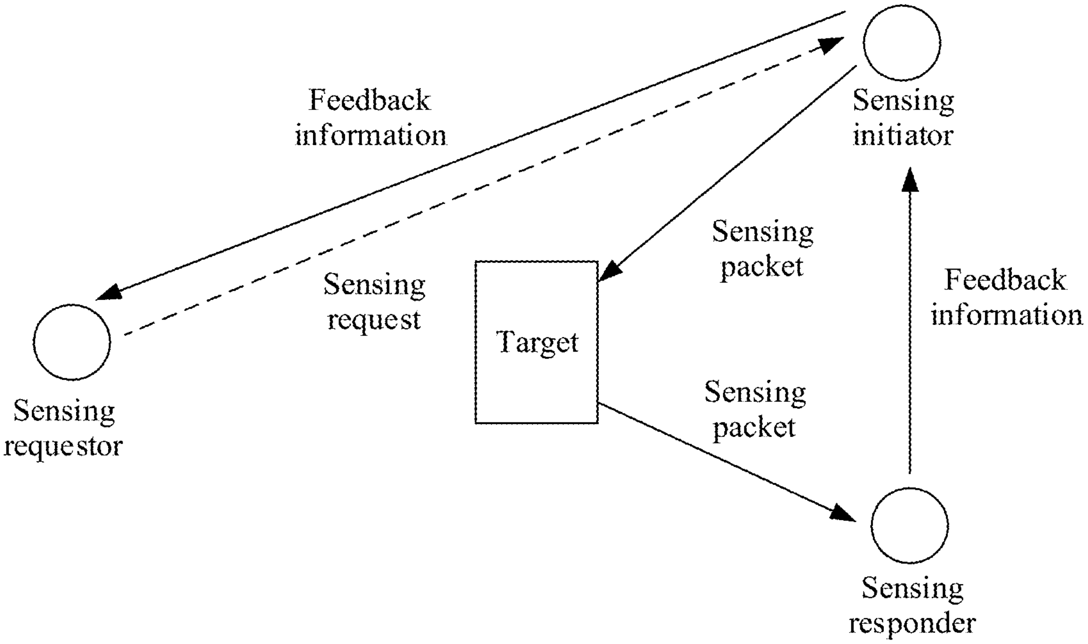
FIG. 2*f* is a diagram of a sensing scenario based on a sensing requestor according to an embodiment of this application.

As shown in FIG. 2*a*, because the sensing initiator is the receiver of the UWB echo signal, the sensing initiator may obtain a sensing measurement result and information related to a target based on the UWB echo signal. Therefore, feedback information does not need to be transmitted between the sensing initiator and the sensing responder through an air interface. As shown in FIG. 2*b*, because the sensing initiator is the transmitter of the UWB signal, and the sensing responder is the receiver of the UWB echo signal, the sensing initiator needs to obtain information related to a target through feedback information sent by the sensing responder. As shown in FIG. 2*c*, the plurality of sensing responders are all transmitters of UWB signals. Similarly, feedback information does not need to be transmitted between the sensing initiator and the plurality of sensing responders through an air interface. However, in the scenario shown in FIG. 2*d*, the sensing initiator needs to obtain feedback information from the plurality of sensing responders. As shown in FIG. 2*e*, the sensing requestor may send a sensing request to the initiator, the sensing responder is a transmitter of a UWB signal, and the sensing initiator is a receiver of a UWB echo signal. After obtaining feedback information, the sensing initiator needs to transmit a feedback to the sensing requestor through an air interface. As shown in FIG. 2*f*, the sensing requestor sends a sensing request to the sensing initiator, the sensing initiator is a transmitter of a UWB signal, and the sensing responder is a receiver of a UWB echo signal. After obtaining feedback information, the sensing responder needs to first transmit a feedback to the sensing initiator through an air interface. Then, the sensing initiator transmits the feedback to the sensing requestor through an air interface.

In general, in FIG. 2*b* and FIG. 2*d*, the sensing responder needs to send the feedback information to the sensing initiator. In FIG. 2*e*, the sensing initiator needs to send the feedback information to the sensing requestor. In FIG. 2*f*, the sensing responder needs to send the feedback information to the sensing initiator, and the sensing initiator needs to send the feedback information to the sensing requestor.

A sensing packet shown in FIG. 2*a* to FIG. 2*e* may be understood as a UWB signal. An apparatus that receives the sensing packet may obtain a sensing measurement result based on the sensing packet. In an embodiment, the apparatus that receives the sensing packet may further feed back the sensing measurement result by using the feedback information.

In a method for feeding back a sensing measurement result based on UWB, a format of feedback information may be shown in Table 1.

TABLE 1

| Subfield (subfield) | Size (size) | | Meaning (meaning) |
|---|---|---|---|
| Element identifier (element ID) | 8 bits | | Element identifier |
| Length (length) | 8 bits | | Bit length |
| $N_{tap}$ | 8 bits | | Quantity of taps |
| Tap amplitude (amplitude) | Relative amplitude of a tap 1 (relative amplitude of tap 1) | 16 bits | Amplitude of the tap 1 relative to the path with the strongest amplitude detected (the amplitude (in-phase and quadrature) of tap 1 relative to the path with the strongest amplitude detected) |
| | Relative amplitude of a tap 2 | 16 bits | Amplitude of the tap 2 relative to the path with the strongest amplitude detected |
| | . . . | . . . | . . . |
| | Relative amplitude of a tap $N_{tap}$ | 16 bits | Amplitude of the tap $N_{tap}$ relative to the path with the strongest amplitude detected |
| Tap delay (tap delay) | Relative delay of the tap 1 (relative delay of tap 1) | 8 bits | Delay of the tap 1 relative to the path with the strongest delay detected (the delay of tap 1 relative to the path with the strongest delay detected) |
| | Relative delay of the tap 2 | 8 bits | Delay of the tap 2 relative to the path with the strongest delay detected |
| | . . . | . . . | . . . |
| | Relative delay of the tap 1 $N_{tap}$ | 8 bits | Delay of the tap $N_{tap}$ relative to the path with the strongest delay detected |
| AOA | AOA of the tap 1 (AOA of tap 1) | 8 bits | AOA of the tap 1 |
| | AOA of the tap 2 | 8 bits | AOA of the tap 2 |
| | . . . | . . . | . . . |
| | AOA of the tap $N_{tap}$ | 8 bits | AOA of the tap $N_{tap}$ |
| ZOA | ZOA of the tap 1 | 8 bits | ZOA of the tap 1 |
| | ZOA of the tap 2 | 8 bits | ZOA of the tap 2 |
| | . . . | . . . | . . . |
| | ZOA of the tap $N_{tap}$ | 8 bits | ZOA of the tap $N_{tap}$ |

According to the feedback information shown in Table 1, signaling overheads of the feedback information is high, and the feedback information cannot effectively use a time similarity and a spatial correlation.

Figure 3:
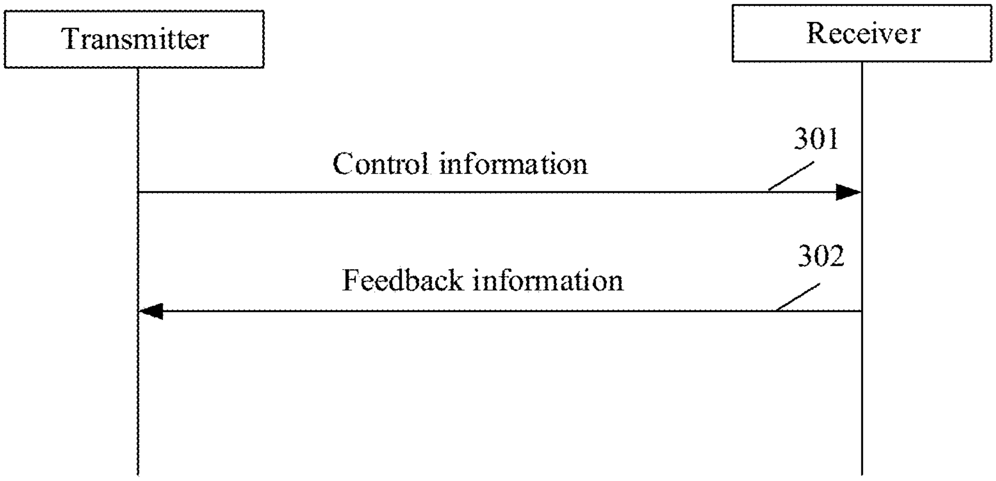
FIG. 3 is a schematic flowchart of a method for feeding back a sensing measurement result based on UWB according to an embodiment of this application.

In view of this, this application provides a method for feeding back a measurement result based on UWB and an apparatus, to not only reduce signaling overheads of the feedback information as much as possible, but also effectively use the time similarity and the spatial correlation of parameters in the feedback information. FIG. 3 is a schematic flowchart of a method for feeding back a sensing measurement result based on UWB according to an embodiment of this application.

The method shown in FIG. 3 may be applied to a transmitter and a receiver. The transmitter may be understood as an end for sending control information, and the receiver may be understood as an end for receiving the control information. Alternatively, the transmitter may be understood as an end for receiving feedback information, and the receiver may be understood as an end for sending the feedback information. For example, the transmitter may include a full function device, and the receiver may include a reduced function device. For another example, the transmitter may include a reduced function device, and the receiver includes a reduced function device. For another example, the transmitter includes a reduced function device, and the receiver includes a full function device. For another example, both the transmitter and the receiver are full function devices. For example, the transmitter may include the sensing initiators shown in FIG. 2*b* and FIG. 2*d*, the receiver may include the sensing responders shown in FIG. 2*b* and FIG. 2*d*, and a CIR parameter provider is the sensing responders shown in FIG. 2*b* and FIG. 2*d*. For another example, the transmitter may include the sensing requestor shown in FIG. 2*e*, the receiver may include the sensing initiator shown in FIG. 2*e*, and a CIR parameter provider is the sensing initiator shown in FIG. 2*e*. For another example, the transmitter may include the sensing initiator shown in FIG. 2*f*, the receiver may include the sensing responder shown in FIG. 2*f*, and a CIR parameter provider is the sensing responder or the sensing initiator shown in FIG. 2*f*. For another example, the transmitter may include the sensing requestor shown in FIG. 2*f*, the receiver may include the sensing initiator shown in FIG. 2*f*, and a CIR parameter provider is the sensing responder or the sensing initiator shown in FIG. 2*f*. For another example, the transmitter may include the sensing requestor shown in FIG. 2*f*, the receiver may include the sensing responder shown in FIG. 2*f*, and a CIR parameter provider is the sensing responder shown in FIG. 2*f*. It may be understood that the transmitter and the receiver listed based on FIG. 2*b*, FIG. 2*d*, FIG. 2*e*, and FIG. 2*f* are merely examples, and any apparatus that can implement the method provided in embodiments of this application falls within the protection scope of this application. Therefore, the transmitter and the receiver shown above should not be construed as a limitation on embodiments of this application. It may be understood that in this application, the method provided in embodiments of this application is described by using the transmitter and the receiver. However, in an information transmission process of the transmitter and the receiver, there may be another apparatus. For example, a forwarding apparatus is used to forward information between the transmitter and the receiver. Therefore, mutual transfer of information in this application may be implemented by using a technical means that can be completed by a person skilled in the art, and another apparatus other than the transmitter and the receiver is not limited in this application.

Before the method shown in FIG. 3 is described, the following describes in detail a sampling unit and a sampling point in embodiments of this application.

Figure 4:
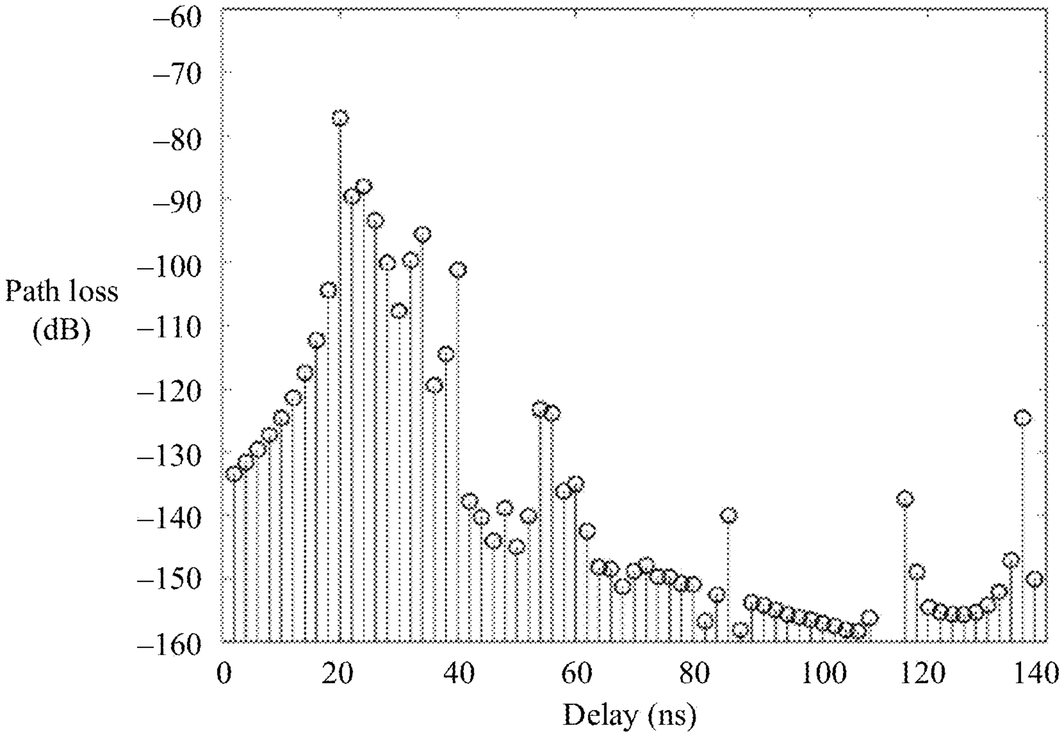
FIG. 4 is a diagram of sampling according to an embodiment of this application.

FIG. 4 is a diagram of sampling according to an embodiment of this application. FIG. 4 shows different taps obtained by performing sampling based on one sensing snapshot (snapshot). In FIG. 4, a horizontal coordinate may be understood as a delay from sending time to receiving time, and a unit of the delay is nanosecond (ns). A vertical coordinate may be understood as path loss information, and a unit of the path loss information is decibel (dB). The path loss information may be understood as information obtained based on attenuation of a UWB signal during transmission from sending to receiving, or information obtained based on attenuation of transmit power of the UWB signal. For example, the path loss information shown in FIG. 4 is determined based on a sum of a square of a real part and a square of an imaginary part of a path loss. As shown in FIG. 4, a method for calculating a vertical coordinate may be $10*\log 10\ (Re^2+Im^2)$—transmit signal power, where Re may be understood as a real part of a received signal (the received signal is sampled to form a tap), and Im may be understood as an imaginary part of the received signal. This should not be construed as a limitation on embodiments of this application. The tap shown in embodiments of this application may carry the delay and the path loss information, or the tap may correspond to both the path loss information and the delay. In general, a relationship between the snapshot and the tap may be understood as follows: A provider of feedback information (or a generator of the feedback information, or understood as a communication apparatus that generates the feedback information) may perform sampling based on a parameter obtained in a snapshot, to obtain a plurality of taps. It may be understood that FIG. 4 merely shows an example in which the tap carries the delay and the path loss information. In an embodiment, one tap may further carry a ZOA, an AOA, and/or the like (not shown in FIG. 4).

For example, one sensing packet may correspond to one snapshot. For example, after receiving a sensing packet, a receiver (for example, the sensing responder shown in FIG. 2*b* and FIG. 2*d*) may determine a parameter obtained based on the sensing packet as a parameter of a snapshot. Alternatively, the snapshot may be understood as a set of taps obtained by sampling a sensing packet. When parameters in a sensing snapshot are sampled, sampling may be performed based on a specific threshold. As shown in FIG. 4, sampling is performed by using an example in which a value greater than-160 dB is used, to obtain different taps in a sensing snapshot. It may be understood that the sampling threshold shown in FIG. 4 is merely an example, and should not be construed as a limitation on embodiments of this application. It may be understood that embodiments of this application are described by using an example in which one sensing packet corresponds to one snapshot. However, this application is further applicable to a case in which one sensing packet corresponds to a plurality of snapshots, or a plurality of sensing packets correspond to one snapshot. In other words, based on a case in which one sensing packet corresponds to one snapshot shown in embodiments of this application, a person skilled in the art may adaptively change a relationship between the sensing packet and the snapshot.

In an embodiment, a quantity of taps included in one snapshot may be determined based on the sampling threshold (for example, −160 dB shown in FIG. 4). In an embodiment, when no sampling threshold is set, duration corresponding to one tap may alternatively be determined based on a sampling frequency. For example, when the sampling frequency is 500 MHZ, a snapshot is sampled, and an interval between two taps is 2 ns. A quantity of taps included in one snapshot is not limited in embodiments of this application. Similarly, a quantity of sensing packets sent by the sensing initiator or a quantity of sensing packets sent by the sensing responder is not limited in embodiments of this application. For example, a quantity of sensing packets refers to a quantity of sensing packets that are obtained after a CIR parameter provider obtains control information and before the CIR parameter provider obtains feedback information based on the control information. A quantity of snapshots corresponding to CIR parameter information fed back in the feedback information is not limited in embodiments of this application. In other words, a quantity of non-reference sampling units shown below is not limited in embodiments of this application.

A snapshot shown above may be referred to as a sampling unit, and a tap may be referred to as a sampling point, a sampling node, a sensing sampling point, or the like. The foregoing names are used for description in the following descriptions of this application, but should not be construed as a limitation on embodiments of this application.

As shown in FIG. 3, the method includes the following operations.

Operation 301: The transmitter sends the control information, and correspondingly, the receiver receives the control information.

The control information includes first control information, and the first control information indicates to feed back the sensing measurement result in a threshold-based feedback manner. The control information may be used to control a manner of feeding back the sensing measurement result. In an embodiment, the control information may be further used to control a feedback periodicity of the sensing measurement result. Alternatively, the control information may be understood as control information related to a sensing procedure. The receiver may feed back the sensing measurement result based on the control information. For example, the sensing measurement result is fed back in a form of CIR parameter information. For example, the control information may be included in a physical layer (PHY) protocol data unit (PPDU). For example, the control information may be carried in a physical layer service data unit (PSDU) in the PPDU. A specific position of the control information is not limited in embodiments of this application.

The sensing measurement result may be understood as an original CIR parameter (or an uncompressed CIR parameter, or one or more taps obtained by sampling a snapshot) obtained based on a sensing packet (the CIR parameter shown in Table 8a below shows an uncompressed CIR parameter). The sensing packet may include one or more UWB pulses (or referred to as UWB signals, sensing signals, or the like). In other words, based on the sensing packet, the CIR parameter provider (for example, may be the receiver) may obtain the sensing measurement result, for example, including a path loss, a delay, a ZOA, and an AOA of a target. It may be understood that the delay may be a delay relative to UWB pulse sending time, or the like. A reference standard for the delay is not limited in embodiments of this application.

In an embodiment, the first control information includes information about a first threshold, and the first threshold is used to determine, based on a sensing measurement result in a reference sampling unit, whether to feed back a sensing measurement result in one or more non-reference sampling units. In other words, the first threshold is a threshold used to measure whether to feed back the sensing measurement result in the one or more non-reference sampling units. For descriptions of the first threshold, refer to the following descriptions of the compression mode. Details are not described herein.

For example, the first threshold shown in embodiments of this application may include any one of a high threshold, a normal threshold, a low threshold, and a lower threshold shown in Table 2. As shown in Table 2, when a value of a field in which the first threshold is located is 00, it indicates that the first threshold is a high threshold; when the value of the field in which the first threshold is located is 01, it indicates that the first threshold is a normal threshold; when the value of the field in which the first threshold is located is 10, it indicates that the first threshold is a low threshold; or when the value of the field in which the first threshold is located is 11, it indicates that the first threshold is a lower threshold. It may be understood that a correspondence between the value of the field in which the first threshold is located and the description shown in Table 2 is merely an example, and should not be construed as a limitation on embodiments of this application. The high threshold, the low threshold, and the lower threshold shown in Table 2 are relative to the normal threshold. The high threshold, the normal threshold, the low threshold, and the lower threshold are merely a classification manner. The threshold may be further classified into, for example, a threshold 1, a threshold 2, a threshold 3, and a threshold 4; a first threshold a, a first threshold b, a first threshold c, and a first threshold d; or a first threshold, a second threshold, a third threshold, and a fourth threshold. Examples are not enumerated herein.

TABLE 2

| Value of a field in which a first threshold is located | Description |
|---|---|
| 00 | High threshold, for example, Threshold = 2*amacCirDifferenceThres |
| 01 | Normal threshold, for example, Threshold = amacCirDifferenceThres |
| 10 | Low threshold, for example, Threshold = ½*amacCirDifferenceThres |
| 11 | Lower threshold, for example, Threshold = ¼*amacCirDifferenceThres |

It should be noted that amacCirDifferenceThres shown in Table 2 may be understood as a MAC constant. A specific value of the MAC constant may be defined in a standard, indicated by a transmitter, or the like. This is not limited in embodiments of this application. For example, the MAC constant may be equal to $5*10^{-4}$. It may be understood that MAC constants shown in embodiments of this application may be the same for all targets, or different targets may have different MAC constants. This is not limited in embodiments of this application.

In an embodiment, a value of the first threshold may be in direct proportion to a radar cross section (RCS) of a target. For example, when the RCS of the target is large, the first threshold may be set to a large value (for example, may be the high threshold or the normal threshold shown in Table 2); or when the RCS of the target is small, the first threshold may be set to a small value (for example, may be the low threshold or the lower threshold shown in Table 2). It may be understood that large and small are relative to each other. For example, when the transmitter does not obtain the RCS of the target, the value of the first threshold may be set to a small value, for example, the low threshold or the lower threshold, so that the receiver can feed back the sensing measurement result in a more comprehensive and detailed manner. When the transmitter finds, based on the obtained sensing measurement result, that the RCS of the target is greater than a specific threshold, the first threshold may be set to a large value, for example, a value greater than the low threshold or the lower threshold. For example, an RCS of an adult may be 1 square meter, and an RCS of a pet may be 0.1 square meters. Therefore, a first threshold of the adult is greater than a first threshold of the pet. Because the value of the first threshold is larger, sensing measurement results of some non-reference sampling units may not need to be fed back. This effectively reduces signaling overheads of the CIR parameter information. Correspondingly, after the transmitter receives the feedback information, even if sensing measurement results of some non-reference sampling units are not fed back, the transmitter may still use the sensing measurement result in the reference sampling unit as the sensing measurement result that is in the non-reference sampling unit and that is not fed back. In other words, the value of the first threshold is updated based on the RCS of the target without affecting obtaining of information related to the target by the transmitter. This effectively reduces the signaling overheads of the CIR parameter information.

In an embodiment, the first control information further includes information about a compression mode, and the compression mode includes any one of the following: no compression, a compression mode in which a fixed quantity of sampling points are used as a unit, and a compression mode in which a variable quantity of sampling points are used as a unit.

TABLE 3

| Value of a field in which a compression mode is located | Description |
|---|---|
| 00 | No compression |
| 01 | Compression mode in which a fixed quantity of sampling points are used as a unit |
| 10 | Compression mode in which a variable quantity of sampling points are used as a unit |
| 11 | Reserved (reserved) |

As shown in Table 3, using a fixed quantity of sampling points as a unit or using a variable quantity of sampling points as a unit means that when it is determined, based on the first threshold, whether to feed back a sensing measurement result in a non-reference sampling unit, a fixed quantity of sampling points (or a variable quantity of sampling points) may be used as a unit to measure whether to feed back a sensing measurement result in a unit. As shown in Table 4, if the sensing measurement result in the unit is fed back, the sensing measurement result in the unit may be compressed by using the sensing measurement result in the reference sampling unit. For example, differentiation (referring to differentiation of a same parameter) is performed on the sensing measurement result (for example, a parameter) in the reference sampling unit and a sensing measurement result (for example, the same parameter) of a corresponding delay in the unit, to obtain a differential sensing measurement result (which may also be understood as a difference between the sensing measurement result in the unit and the sensing measurement result of a same delay in the reference sampling unit), and the differential sensing measurement result is included in the CIR parameter information. It may be understood that Table 4 and Table 3 may be understood as tables of compression modes described in different manners, and Table 4 may be understood as further detailed descriptions of the compression modes based on Table 3.

TABLE 4

| Value of a field in which a compression mode is located | Description |
|---|---|
| 00 | No compression |
| 01 | A group of fixed quantity of taps are used as a unit, and if a difference between each tap in the group and a tap of a same delay in the reference sampling unit is less than the first threshold, a difference between the group of taps and the tap of the same delay in the reference sampling unit is not fed back; or if a difference between a tap in the group and a tap of a same delay in the reference sampling unit is greater than the first threshold, a difference between the group of taps and the tap of the same delay in the reference sampling unit needs to be fed back. |
| 10 | A group of variable quantity of taps are used as a unit, and if a difference between each tap in the group and a tap of a same delay in the reference sampling unit is less than the first threshold, a difference between the group of taps and the tap of the same delay in the reference sampling unit is not fed back; or if a difference between a tap in the group and a tap of a same delay in the reference sampling unit is greater than the first threshold, a difference between the group of taps and the tap of the same delay in the reference sampling unit needs to be fed back. |
| 11 | Reserved (reserved) |

For ease of description, sensing measurement results in a unit are referred to as a group of sensing measurement results in the following. In other words, a fixed quantity of sampling points are used as a unit, and sensing measurement results in a sampling unit may be grouped to obtain a plurality of groups of sensing measurement results. If a sensing measurement result includes path loss information and a delay, the plurality of groups of sensing measurement results may also be referred to as a plurality of groups of taps, and a quantity of taps in each group of taps may be fixed or variable. Certainly, the sensing measurement result may further include an AOA and a ZOA (two or more antennas are used when the sensing measurement result is measured). In this case, even if the plurality of groups of sensing measurement results include the path loss information, the delay, the AOA, and the ZOA, the tap (namely, the delay and a path loss) can still be used to measure whether to feed back all parameters in this group.

It may be understood that, because the sensing measurement result in the non-reference sampling unit may be greater than a sensing measurement result of a corresponding delay in the reference sampling unit, or may be less than the sensing measurement result of the corresponding delay in the reference sampling unit, the differential sensing measurement result may include a positive value and a negative value. Therefore, the transmitter can accurately restore the sensing measurement result in the non-reference sampling unit based on the differential sensing measurement result and the sensing measurement result in the reference sampling unit.

The following provides descriptions with reference to the first threshold and the compression mode.

In an example, if a difference between each tap in a group and a tap of a same delay in the reference sampling unit is less than the first threshold, all taps in the group are not fed back, or all sensing measurement results (for example, the sensing measurement results include path loss information and a delay, or may further include an AOA and a ZOA) in the group are not fed back, or the difference between each tap in the group and the tap of the same delay in the reference sampling unit is not fed back. In other words, when it is determined not to feed back the sensing measurement result in the group, even if the CIR parameter information does not include information about the sensing measurement result in the group, the transmitter may still estimate the sensing measurement result in the group by using the sensing measurement result in the reference sampling unit (for example, the sensing measurement result in the group may be replaced with the sensing measurement result in the reference sampling unit). This can effectively reduce signaling overheads without affecting obtaining of the information related to the target by the transmitter.

It may be understood that, in embodiments of this application, the "difference" in the difference between each tap in the group and the tap of the same delay in the reference sampling unit may be a difference between path losses, or may be a difference between real parts of path losses, or may be a difference between imaginary parts of path losses, or may be a difference determined based on $Re^2+Im^2$ (as shown in FIG. 4). Examples are not enumerated herein. A specific manner of calculating the difference is not limited in embodiments of this application.

It should be noted that although the transmitter estimates the sensing measurement result in the group by using the sensing measurement result in the reference sampling unit, precision of the information that is related to the target and obtained by the transmitter is not affected. The reason is as follows: Data is quantized even if the sensing measurement result is fed back in a no compression mode. In this case, the CIR parameter information obtained by the transmitter is data obtained through quantization. The first threshold is determined in embodiments of this application, and an error caused by replacing a sensing measurement result in a group with the sensing measurement result in the reference sampling unit is less than an error generated during quantization processing. Therefore, precision of the information that is related to the target and obtained by the transmitter is not reduced, and signaling overheads can be further reduced.

In another example, if a difference between a tap in a group and a tap of a same delay in the reference sampling unit is greater than the first threshold, differences between all taps in the group and the tap of the same delay in the reference sampling unit are fed back, or a difference between all sensing measurement results in the group (namely, the difference between the tap in the group and the tap of the same delay in the reference sampling unit) is fed back. In other words, if a difference between a tap in a group and a tap of a same delay in the reference sampling unit is greater than the first threshold, it may be determined that all sensing measurement results in the group are fed back. The sensing measurement result that needs to be fed back is fed back in a difference manner, so that signaling overheads can be effectively reduced.

In still another example, if a difference between only a small quantity of taps in a group and a tap of a same delay in the reference sampling unit is greater than the first threshold, only the small quantity of taps in the group may be fed back. For example, if a quantity of taps that are in the group and whose difference is greater than the first threshold is less than or equal to 5, only the five taps may be fed back, and other taps in the group may not be fed back. When it is determined to feed back a sensing measurement result in a group, a small quantity of taps (or sensing measurement results corresponding to the small quantity of taps) in the group may be fed back in a difference manner, to effectively reduce the signaling overheads of the CIR parameter information.

For example, a sampling unit shown in FIG. 4 is used as an example. It is assumed that the sampling unit shown in FIG. 4 is a non-reference sampling unit. For example, a difference between a path loss at a horizontal coordinate 31 ns and a path loss at a horizontal coordinate 31 ns in the reference sampling unit is compared with the first threshold, and if the difference is less than or equal to the first threshold, all taps in a group in which the horizontal coordinate 31 ns is located may not be fed back (that is, the path loss and the delay are not fed back when the sensing measurement result includes the path loss and the delay), or a sensing measurement result corresponding to each tap in the group in which the horizontal coordinate 31 ns is located is not fed back (that is, the path loss, the delay, the AOA, and the ZOA are not fed back when the sensing measurement result includes the path loss, the delay, the AOA, and the ZOA), or the like.

It may be understood that a specific value of a quantity of taps included in a group is not limited in embodiments of this application. In embodiments of this application, when the difference shown above is equal to the first threshold, whether a sensing measurement result in a group is fed back is not limited. In other words, if a difference between a tap in a group and a tap of a same delay in the reference sampling unit is equal to the first threshold, differences between all taps in the group and the tap of the same delay in the reference sampling unit may not be fed back, or the differences between all taps in the group and the tap of the same delay in the reference sampling unit may be fed back.

In an embodiment, the first control information further includes address information of a communication apparatus that receives the control information.

In embodiments of this application, there may be one or more communication apparatuses, namely, receivers, that receive the control information. The first control information includes address information of one or more receivers, so that each receiver can clearly learn the control information, and each receiver processes a sensing measurement result based on the control information, to feed back a sensing measurement result obtained by each receiver. This effectively improves communication efficiency.

For example, Table 5 shows content of control information according to embodiments of this application. Content shown in Table 5 may also be understood as an information element (IE) in the control information. Whether the control information includes another IE is not limited in embodiments of this application. For example, the IE shown in Table 5 may be referred to as a sensing CIR feedback control IE (sensing CIR feedback control IE). As shown in Table 5, the sensing CIR feedback control IE may include an element identifier (which may also be referred to as an element ID) (element ID), an address size specifier (address size specifier), a quantity of responders (responder number), and first control information. The first control information may also be referred to as a CIR feedback control parameter (CIR feedback control parameter). Content of the first control information may be shown in Table 6. As shown in Table 6, a device address may be understood as an address of the receiver; a field in which a CIR feedback threshold is located may be understood as the field in which the first threshold is located, as shown in Table 2; and a field in which the compression mode is located may be understood as the field shown in Table 3 or Table 5.

TABLE 5

| Bits: 0 to 7 | 8 | 9 to 15 | Octets: variable |
|---|---|---|---|
| Element ID (element ID) | Address size specifier (address size specifier) | Quantity of responders (responder number) | First control information |

TABLE 6

| Octets: 2/8 | Bits: 0 and 1 | 2 | 4 and 5 | 6 and 7 |
|---|---|---|---|---|
| Device address (device | CIR feedback threshold (CIR | CIR reference information request | Compression mode (compression | Reserved (reserved) |

TABLE 6-continued

| Octets: 2/8 | Bits: 0 and 1 | 2 | 4 and 5 | 6 and 7 |
|---|---|---|---|---|
| Address) | feedback threshold) | (reference CIR request) | mode) | |

For example, as shown in Table 5, the element ID may indicate an ID of the sensing CIR feedback control IE. The address size specifier may indicate a quantity of bytes indicated by the device address. If a value of a field in which the address size specifier is located is 0, it may indicate that the device address uses a 2-byte short address; or if a value of a field in which the address size specifier is located is 1, it may indicate that the device address uses an 8-byte extended address. The quantity of responders may indicate a quantity of receivers. For example, in FIG. 2*b* and FIG. 2*d*, the quantity of responders refers to a quantity of sensing responders participating in a sensing process; in FIG. 2*e*, the quantity of responders refers to a quantity of sensing initiators; and in FIG. 2*f*, the quantity of responders may be a quantity of sensing initiators, or may be a quantity of sensing responders. The first control information may include a CIR feedback control parameter required by each responder. In other words, the first control information may include control parameters required by each responder, such as a first threshold and a compression mode. For example, as shown in Table 6, the device address may indicate an address of a responder device. For a value of the CIR feedback threshold, refer to Table 2. The CIR reference information request may be understood as a request for the sensing measurement result in the reference sampling unit. For example, if a value of a field in which the CIR reference information request is located is 0, it indicates that the responder does not need to feed back the sensing measurement result in the reference sampling unit (which may also be referred to as CIR reference information); or if a value of a field in which the CIR reference information request is located is 1, it indicates that the responder needs to feed back the sensing measurement result in the reference sampling unit. For a value of the compression mode, refer to Table 3 or Table 4. Details are not described herein again.

It should be noted that, when a moving speed of the target is high, the sensing measurement result in the reference sampling unit may be updated more frequently, and when the moving speed of the target is low, a frequency of updating the sensing measurement result in the reference sampling unit may be reduced. To be specific, when the transmitter finds that the moving speed of the target is greater than a threshold, the transmitter may set the value of the CIR reference information request to 1, to request the receiver to update the sensing measurement result in the reference sampling unit. When the moving speed of the target is less than a threshold, the transmitter may set the value of the CIR reference information request to 0, indicating that the receiver does not need to update the sensing measurement result in the reference sampling unit. It may be understood that when the moving speed of the target is high, the original CIR parameter also changes greatly. The sensing measurement result in the reference sampling unit, namely, the CIR reference information, is updated more frequently, so that a dynamic range of the difference, namely, the differential information, shown in embodiments of this application can be reduced. In this way, the differential information is expressed by using a small quantity of bits.

Operation 302: The receiver sends the feedback information, and correspondingly, the transmitter receives the feedback information.

The feedback information includes the CIR parameter information, and the CIR parameter information is obtained by processing the sensing measurement result based on the first control information. The CIR parameter information refers to information obtained by processing the original CIR parameter based on the first control information. For example, the CIR parameter information may be information obtained by performing quantization processing on the original CIR parameter based on the first control information. For another example, the CIR parameter information may be information obtained by performing quantization and compression processing on the original CIR parameter based on the first control information.

It may be understood that, after receiving the feedback information, the receiver may obtain information such as a distance, a speed, or attenuation of the target based on the feedback information. The feedback information may be information about one target, or may be information about a plurality of targets. This is not limited in embodiments of this application. For example, after receiving the feedback information, the receiver may parse a parameter related to the target, to obtain information about one or more targets.

In an embodiment, the feedback information further includes information related to the CIR parameter information, and the information related to the CIR parameter information includes at least one of the following:

a quantity of sampling units corresponding to the CIR parameter information, a quantity of sampling points included in each sampling unit, a quantity of antennas used for measuring the sensing measurement result, and information indicating whether the sensing measurement result in the reference sampling unit is stored.

For example, the quantity of sampling units corresponding to the CIR parameter information and the quantity of sampling points included in each sampling unit are included, so that the transmitter can learn a total quantity of sampling points corresponding to the CIR parameter information obtained by the transmitter. In an embodiment, if grouping is performed in a unit of a fixed quantity of sampling points, the transmitter may further obtain a total quantity of groups. For example, the quantity of antennas used for measuring the sensing measurement result is included, so that the transmitter can accurately distinguish, from the CIR parameter information, sensing measurement results obtained by different antennas. For example, the information indicating whether the sensing measurement result in the reference sampling unit (which may also be referred to as reference information, the CIR reference information, or the like) is stored is included, so that the transmitter can indicate, in next control information with reference to the information, to update the sensing measurement result in the reference sampling unit (or indicate to update the CIR reference information).

For example, each piece of information shown above may exist in the feedback information in a form of a field. Content shown in Table 7 may be included in a CIR feedback report IE (CIR feedback report IE) in the feedback information. Whether the feedback information includes another IE is not limited in embodiments of this application.

TABLE 7

| Field (subfield) | Size (Size) | Description (Description) |
|---|---|---|
| Provider address size specifier (Provider Address Size Specifier) | Bit: 0 | Indicate a quantity of bytes in an address of a provider of CIR parameter information, namely, a quantity of bytes in an address of a device for measuring a sensing measurement result. For example, if a value is 0, it indicates that a 2-byte short address is used; or if a value is 1, it indicates that an 8-byte extended address is used. |
| Requestor address size specifier (Requestor Address Size specifier) | Bit: 1 | Indicate a quantity of bytes in an address of a receiver of the CIR parameter information, for example, a quantity of bytes in an address of a sensing initiator or a quantity of bytes in an address of a requestor in a sensing by proxy scenario. For example, if a value is 0, it indicates that a 2-byte short address is used; or if a value is 1, it indicates that an 8-byte extended address is used. |
| Quantity of requestors (Requestor Number) | Bits: 2 to 5 | Quantity of requestors of the CIR parameter information |
| Quantity of receive antennas (Receiver Antenna Number) | Bits: 6 to 8 | Quantity of antennas used for measuring the sensing measurement result or quantity of antennas of a provider when an original CIR parameter is measured |
| Quantity of sampling units (Snapshot Number) | Bits: 9 to 13 | Quantity of snapshots whose CIR parameter information needs to be fed back |
| Quantity of sampling points in each sampling unit (Tap Number Per Snapshot) | Bits: 14 to 21 | Quantity of taps in each snapshot |
| CIR reference present (CIR Reference Present) | Bit: 22 | When a compression mode is 01 or 10, if a value of a CIR reference present field is 0, the CIR parameter information may include only CIR differential information (namely, the difference shown above); or if a value of a CIR reference present field is 1, the CIR parameter information includes CIR differential information and CIR reference information. When the compression mode is 00 or 11, this field is ignored. |
| Compression mode (Compression mode) | Bits: 23 and 24 | Refer to Table 3 or Table 4 |
| Local CIR reference status (Local CIR Reference Status) | Bit: 25 | If a value is 1, it indicates that the provider of the CIR parameter information locally stores the CIR reference information; or if a value is 0, it indicates that the provider of the CIR parameter information does not locally store the CIR reference information. |
| Reserved (Reserved) | Bits: 26 to 31 | |
| Provider address (Provider Address) | Octets: 2/8 | Address of the provider of the CIR parameter information |
| Requestor address (Requestor Address) | Octets: Variable | Address of the receiver of the CIR parameter information. For example, there may be one or more receivers, and a quantity of bytes may be 2n or 8n, where n indicates a quantity of receivers, and n is a positive integer. |

TABLE 7-continued

| Field (subfield) | Size (Size) | Description (Description) |
|---|---|---|
| CIR feedback report parameter (CIR Feedback Report Parameter) | Octets: Variable | CIR parameter information, or referred to as a CIR feedback report parameter |

It may be understood that, in FIG. 2*b*, FIG. 2*d*, and FIG. 2*f*, the provider refers to the sensing responder, and in FIG. 2*e*, the provider refers to the sensing initiator. In FIG. 2*b* and FIG. 2*d*, the requestor refers to the sensing initiator, in FIG. 2*e*, the requestor refers to the sensing requestor, and in FIG. 2*f*, the requestor may be the sensing initiator, or may be the sensing requestor. For example, when the sensing responder already knows the address of the sensing requestor, the requestor may be the sensing requestor; or when the sensing responder does not know the address of the sensing requestor, the requestor may be the sensing initiator.

It should be noted that a value of the local CIR reference status shown in Table 7 affects a value of the CIR reference information request in next control information. For example, when the local CIR reference status is 0, the value of the CIR reference information request in the next control information can only be 1, that is, it indicates that the receiver is requested to update the CIR reference information. When the local CIR reference status is 1, the value of the CIR reference information request in the next control information may be set to 0 or 1 based on an actual requirement. In embodiments of this application, the CIR reference information request field and the local CIR reference status field in the "handshake" form are added, so that communication reliability can be enhanced, and communication efficiency of both communication parties can be improved.

For descriptions of the CIR feedback report parameter, refer to Table 8a to Table 8d. It may be understood that Table 8a to Table 8d are shown by using the path loss information as an example. However, when the receiver feeds back the CIR parameter information, the delay, the AOA, the ZOA, and the like may be further included, which are not shown one by one in the following. For example, a CIR of a sampling point 1 in a sampling unit 1 may further include a delay (namely, a time domain relative to sending time), a differential AOA of a tap 1 in a snapshot 1, and a differential ZOA of the tap 1 in the snapshot 1. Examples are not enumerated herein.

It may be understood that descriptions of values of fields and meanings corresponding to the values of the fields shown in Table 7 are merely examples, and should not be construed as a limitation on embodiments of this application. For example, the provider address size specifier field and the requestor address size specifier field may also be described as follows: If a value is 1, it indicates that a 2-byte short address is used; or if a value is 0, it indicates that an 8-byte extended address is used. In addition, a relationship between a value of a field in which a compression mode is located and a compression mode corresponding to each value may alternatively be different from that in Table 3 or Table 4. Examples are not enumerated herein.

In an embodiment, when the value of the compression mode is 00, the CIR parameter information may be shown in Table 8a. In other words, Table 8a shows an example in which no compression is performed. The CIR parameter information in Table 8a is a tap obtained by sampling a parameter obtained in a snapshot, and the tap does not need to be determined by using the first threshold.

TABLE 8a

| Field | Size (Bits) | | Description |
|---|---|---|---|
| CIR of a sampling point 1 in a sampling unit 1 (Tap 1 of CIR in snapshot 1) | In-phase component/ amplitude (In-phase Component/ Amplitude) | 16 | Signed integer, using-a preagreed value as a quantization unit (Scaled to pre-agreed level, encoded as a signed integer) |
| | Quadrature component/phase (Quadrature Component/Phase) | 16 | Signed integer, using a pre-agreed value as a quantization unit |
| CIR of a sampling point 2 in the sampling unit 1 (Tap 2 of CIR in snapshot 1) | In-phase component/ amplitude | 16 | Signed integer, using a pre-agreed value as a quantization unit |
| | Quadrature component/phase | 16 | Signed integer, using a pre-agreed value as a quantization unit |
| . . . | . . . | | . . . |
| CIR of a sampling point N_tap in a sampling unit N_snapshot (Tap N_tap of CIR in snapshot N_snapshot) | In-phase component/ amplitude | 16 | Signed integer, using a pre-agreed value as a quantization unit |
| | Quadrature component/phase | 16 | Signed integer, using a pre-agreed value as a quantization unit |

The parameters and the bit lengths shown in Table 8a are merely examples, and should not be construed as a limitation on embodiments of this application. It may be understood that both N_snapshot and N_tap shown above are positive integers.

In an embodiment, the feedback information further includes information about a first bitmap, and each bit in the first bitmap indicates whether to feed back a sensing measurement result in a corresponding group. In other words, after the sensing measurement results are grouped, whether to feed back a sensing measurement result in a corresponding group may be indicated in a bitmap mode. For example, if a value of a bit in the first bitmap is 1, it indicates that a sensing measurement result in a group corresponding to the bit is not fed back. In addition, a difference between the sensing measurement result in the corresponding group and a sensing measurement result of a same delay in the reference sampling unit is less than the first threshold. For another example, if a value of a bit in the first bitmap is 0, it indicates that a sensing measurement result in a group corresponding to the bit is fed back. In addition, a difference between at least one tap in the corresponding group and a tap of a same delay in the reference sampling unit is greater than the first threshold (which may also be referred to as that a difference between at least one tap in the corresponding group and a corresponding tap in the reference sampling unit is greater than the first threshold).

For example, when the value of the compression mode is 01, the CIR parameter information may be shown in Table 8b.

TABLE 8b

| Field | | Size (Bits) | Description |
|---|---|---|---|
| Quantity of taps in each group (Tap Number in a Group) | 8 | | Quantity of taps in each group |
| CIR of a sampling point 1 in a sampling unit 1 (Tap 1 of CIR in snapshot 1) | In-phase component/ amplitude | 16 | Signed integer, using a pre-agreed value as a quantization unit |
| | Quadrature component/ phase | 16 | Signed integer, using a pre-agreed value as a quantization unit |
| . . . | | . . . | . . . |
| CIR of a sampling point N_tap in the sampling unit 1 (Tap N_tap of CIR in snapshot 1) | In-phase component/ amplitude | 16 | Signed integer, using a pre-agreed value as a quantization unit |
| | Quadrature component/ phase | 16 | Signed integer, using a pre-agreed value as a quantization unit |
| Snapshot 2 | First bitmap (Bit Map) | Determine a bit length based on the following information: a quantity of sampling points in each sampling unit (Tap Number Per Snapshot)/a quantity of taps in each group (Tap Number in a Group) | Each group of taps correspond to a bit in the bitmap. If a bit is 1, it indicates that at least one of differences between all taps in the group and a corresponding tap in the reference sampling unit is greater than the first threshold, and all differences of taps in the group need to be fed back. If a bit is 0, it indicates that differences between all taps in the group and a corresponding tap in the reference sampling unit are less than a threshold, and no difference between taps in the group needs to be fed back. |
| | In-phase component/ amplitude | 12 | Signed integer, using a pre-agreed value as a quantization unit |
| | Quadrature component/ phase | 12 | Signed integer, using a pre-agreed value as a quantization unit |
| . . . | . . . | | . . . |
| | In-phase component/ amplitude | 12 | Signed integer, using a pre-agreed value as a quantization unit |
| | Quadrature component/ phase | 12 | Signed integer, using a pre-agreed value as a quantization unit |
| . . . | . . . | | . . . |

It may be understood that the bit length of the first bitmap shown in Table 8b may be determined based on the quantity of taps in each snapshot shown in Table 7 and the quantity of taps in each group shown in Table 8b. For example, bit length of the first bitmap=quantity of taps in each snapshot/ quantity of taps in each group.

It may be understood that the reference sampling unit shown in Table 8b is shown by using the snapshot 1 as an example, but should not be construed as a limitation on embodiments of this application. For example, the reference sampling unit may alternatively be a snapshot 2, a snapshot 3, or the like, that is, the CIR reference information may be a CIR parameter of the snapshot 1, or may be a CIR parameter of another snapshot. In an embodiment, the N_tap taps included in the snapshot 1 shown in Table 8b may be grouped in a unit of a fixed quantity of taps, or may not be grouped. This is not limited in embodiments of this application. The CIR parameter of the snapshot 1 shown in Table 8b is shown by using an example in which grouping is not performed. Therefore, Table 8b separately shows N_tap taps in the snapshot 1. In the CIR parameter of the snapshot 2 shown in Table 8b, grouping needs to be performed in a unit of a fixed quantity of taps. Therefore, Table 8b does not show, one by one, N_tap taps included in the snapshot 2.

The CIR parameter information shown in Table 8b is shown by using an example in which the CIR reference information (namely, the sensing measurement result in the reference sampling unit) is included. For example, the CIR parameter information shown in Table 8b may alternatively not include the CIR reference information. In this case, CIR reference information in previous feedback information having CIR reference information may be used as CIR reference information in current feedback information. If the current feedback does not require the CIR reference information (that is, the CIR parameter information does not include the CIR reference information), the snapshot 1 also feeds back the sensing measurement result in a manner of another snapshot, that is, feeds back the sensing measurement result in the snapshot 1 in a difference manner. It may be understood that descriptions of the CIR reference information are also applicable to Table 8c and Table 8d, and details are not described below again.

In an embodiment, when the compression mode includes the compression mode in which a variable quantity of sampling points are used as a unit, the feedback information further includes the following information: a quantity of groups in one sampling unit, and a start sampling point and an end sampling point in each group. Alternatively, the feedback information further includes the following information: a quantity of groups in one sampling unit, a start sampling point in each group, and a quantity of sampling points in each group. In other words, the foregoing information is included, so that when obtaining the feedback information, the transmitter can clearly learn grouping information of the sensing measurement result of the receiver, to quickly restore the original CIR parameter.

For example, when the value of the compression mode is 10, the CIR parameter information may be shown in Table 8c.

TABLE 8c

| Field | Size (Bits) | Description |
|---|---|---|
| Quantity of groups in a sampling unit (Group Number in a snapshot) | 8 | Quantity of groups in each snapshot, namely, M |
| Group 1 start tap index (Group 1 Start Tap Index) | 8 | Index of a start tap in a group 1 |
| Quantity of taps in the group 1 (Group 1 Tap Number) (or group 1 end tap index) | 8 | Total quantity of taps in the group 1 (or an index of an end tap in the group 1) |
| . . . | . . . | . . . |
| Group M start tap index | 8 | Index of a start tap in a group M |

TABLE 8c-continued

| Field | Size (Bits) | | Description |
|---|---|---|---|
| (Group M Start Tap Index) | | | |
| Quantity of taps in the group M (Group M tap Number) | 8 | | Total quantity of taps in the group M (or an index of an end tap in the group M) |
| Tap 1 of CIR in snapshot 1 | In-phase component/amplitude | 16 | Signed integer, using a pre-agreed value as a quantization unit |
| | Quadrature component/phase | 16 | Signed integer, using a pre-agreed value as a quantization unit |
| . . . | . . . | | . . . |
| Tap N_tap of CIR in snapshot 1 | In-phase component/amplitude | 16 | Signed integer, using a pre-agreed value as a quantization unit |
| | Quadrature component/phase | 16 | Signed integer, using a pre-agreed value as a quantization unit |
| Snapshot 2 | First bitmap (Bit Map) | M | Each group of taps correspond to a bit in the bitmap. If a bit is 1, it indicates that at least one of differences between all taps in the group and a corresponding tap in the reference sampling unit is greater than the first threshold, and all differences of taps in the group need to be fed back. If a bit is 0, it indicates that differences between all taps in the group and a corresponding tap in the reference sampling unit are less than a threshold, and no difference between taps in the group needs to be fed back. |
| | In-phase component/amplitude | 12 | Signed integer, using a pre-agreed value as a quantization unit |
| | Quadrature component/phase | 12 | Signed integer, using a pre-agreed value as a quantization unit |
| . . . | . . . | | . . |
| | In-phase component/amplitude | 12 | Signed integer, using a pre-agreed value as a quantization unit |
| | Quadrature component/phase | 12 | Signed integer, using a pre-agreed value as a quantization unit |
| . . . | . . . | | . . . |

It should be noted that Table 8c is shown by using an example in which one snapshot is divided into M groups, where M is a positive integer. When a snapshot is sampled, a delay of each tap in the snapshot is fixed because a sampling frequency applicable to the receiver is fixed. Therefore, the difference shown above in this application may be generally understood as a difference between a tap of a delay and a tap of the delay in the snapshot used as the CIR reference information. The grouping manner of the snapshot 1 shown in Table 8c is also applicable to the grouping manner of the remaining M−1 snapshots. In other words, it is assumed that in one piece of feedback information, tap grouping manners of all snapshots remain unchanged. Alternatively, a tap grouping manner of the snapshot in the current feedback information may be the same as a tap grouping manner of the CIR reference information in the previous feedback information having CIR reference information.

In an embodiment, the feedback information further includes information about a second bitmap, and each bit in the second bitmap indicates whether to feed back a sensing measurement result of a corresponding tap. The following method is included in the related description of operation 301: If a difference between only a small quantity of taps in a group and a tap of a same delay in the reference sampling unit is greater than the first threshold, only the small quantity of taps in the group may be fed back. In this case, a value of a bit that is in the first bitmap and that corresponds to the group may be 1, that is, at least one of differences between all taps in the group and a corresponding tap in the reference sampling unit is greater than the first threshold. Each bit in the second bitmap may indicate whether to feed back a sensing measurement result of a corresponding tap in the group. The bit length of the first bitmap is determined based on a total quantity of groups, or the bit length of the first bitmap may be determined based on a quantity of sampling points in each sampling unit and a quantity of taps in each group. A bit length of the second bitmap may be determined based on the compression mode. For example, in the compression mode in which a fixed quantity of sampling points are used as a unit, the bit length of the second bitmap may be a fixed quantity. For another example, in the compression mode in which a variable quantity of sampling points are used as a unit, the bit length of the second bitmap may be determined based on a quantity of taps in each group during grouping of each snapshot. The second bitmap is added, so that bits occupied by CIR parameter information in each snapshot can be simplified by using a few bits in the second bitmap, and signaling overheads can be further reduced. It may be understood that the second bitmap shown in embodiments of this application is applicable to Table 8b and Table 8c. Table 8c is merely used as an example below to show the second bitmap, but should not be construed as a limitation on embodiments of this application. For example, the second bitmap may be added after adaptive modification according to Table 8b. Details are not described herein.

For example, when the value of the compression mode is 10, the CIR parameter information may be shown in Table 8d. For descriptions of Table 8d, refer to Table 8c and the like. Details are not described herein again.

TABLE 8d

| Field | Size (Bits) | | Description |
|---|---|---|---|
| Quantity of groups in a sampling unit (Group Number in a snapshot) | 8 | | Quantity of groups in each snapshot, namely, M |
| Group 1 start tap index (Group 1 Start Tap Index) | 8 | | Index of a start tap in a group 1 |
| Quantity of taps in the group 1 (Group 1 Tap Number) (or group 1 end tap index) | 8 | | Total quantity of taps in the group 1 (or an index of an end tap in the group 1) |
| . . . | . . . | | . . . |
| Group M start tap index (Group M Start Tap Index) | 8 | | Index of a start tap in a group M |
| Quantity of taps in the group M (Group M tap Number) | 8 | | Total quantity of taps in the group M |
| Tap 1 of CIR in snapshot 1 | In-phase component/amplitude | 16 | Signed integer, using a pre-agreed value as a quantization unit |
| | Quadrature component/phase | 16 | Signed integer, using a pre-agreed value as a quantization unit |
| . . . | . . . | | . . . |
| Tap N_tap of CIR in snapshot 1 | In-phase component/amplitude | 16 | Signed integer, using a pre-agreed value as a quantization unit |
| | Quadrature component/phase | 16 | Signed integer, using a pre-agreed value as a quantization unit |
| Snapshot 2 | First bitmap (Bit Map) | M | Each group of taps correspond to a bit in the bitmap. If a bit is 1, it indicates that at least one of differences between all taps in the group and a corresponding tap in the reference sampling unit is greater than the first threshold, and all differences of taps in the group need to be fed back. If a bit is 0, it indicates that differences between all taps in the group and a corresponding tap in the reference sampling unit are less than a threshold, and no |

TABLE 8d-continued

| Field | Size (Bits) | | Description |
|---|---|---|---|
| | | | difference between taps in the group needs to be fed back. |
| | If a value of a bit corresponding to the group 1 in the first bitmap is 1, a second bitmap of the group 1 in the snapshot 2 is determined (that is, the second bitmap is determined based on a group corresponding to a bit whose value is 1 in the first bitmap). | The bit length is equal to a total quantity of taps in the group 1. | Each tap in the group 1 corresponds to a bit in the bitmap. If a bit is 1, it indicates that a difference between the tap and a corresponding tap in the reference sampling unit is greater than the first threshold, and a difference of the tap needs to be fed back. If a bit is 0, it indicates that a difference between the tap and a corresponding tap in the reference sampling unit is less than the first threshold, and a difference of the tap does not need to be fed back. |
| | In-phase component/amplitude | 12 | Signed integer, using a pre-agreed value as a quantization unit |
| | Quadrature component/phase | 12 | Signed integer, using a pre-agreed value as a quantization unit |
| | . . . | | . . . |
| | In-phase component/amplitude | 12 | Signed integer, using a pre-agreed value as a quantization unit |
| | Quadrature component/phase | 12 | Signed integer, using a pre-agreed value as a quantization unit |
| | . . . | | . . . |
| | If a value of a bit corresponding to the group M in the first bitmap is 1, a second bitmap of the group M in the snapshot 2 is determined. | The bit length is equal to a total quantity of taps in the group M. | Each tap in the group M corresponds to a bit in the bitmap. If a bit is 1, it indicates that a difference between the tap and a corresponding tap in the reference sampling unit is greater than the first threshold, and a difference of the tap needs to be fed back. If a bit is 0, it indicates that a difference between the tap and a corresponding tap in the reference sampling unit is less than the first threshold, and a difference of the tap does not need to be fed back. |
| | In-phase component/amplitude | 12 | Signed integer, using a pre-agreed value as a quantization unit |
| | Quadrature component/phase | 12 | Signed integer, using a pre-agreed value as a quantization unit |
| | . . . | | . . . |
| | In-phase component/amplitude | 12 | Signed integer, using a pre-agreed value as a quantization unit |
| | Quadrature component/phase | 12 | Signed integer, using a pre-agreed value as a quantization unit |
| . . . | . . . | | . . . |

It may be understood that a group corresponding to a bit whose bit value is 1 in the first bitmap may have a second bitmap. Therefore, Table 8d is merely an example in which values of bits corresponding to the group 1 and the group M in the snapshot 2 in the first bitmap are 1. However, this should not be construed as a limitation on embodiments of this application.

It may be understood that the CIR parameter information shown in Table 8a to Table 8d in this application may indicate the path loss information in a manner of an amplitude and a phase, or indicate the path loss information in a manner of an in-phase component and a quadrature component. This is not limited in embodiments of this application. In an embodiment, the feedback information may further include information about a data mode indicating the path loss information. For example, if a value of a field in which the data mode indicating the path loss information is located is 0, it indicates that the path loss information is fed back in a form of an in-phase component and a quadrature component (which may also be referred to as feeding back the path loss information in a form of a real part and an imaginary part). If a value of a field in which the data mode indicating the path loss information is located is 1, it indicates that the path loss information is fed back in a form of an amplitude and a phase.

The feedback information includes the information about the data mode indicating the path loss information, so that forms of the path loss information are more diversified, and different feedback forms of sensing information can be effectively selected for different application scenarios. For example, when a bit width (namely, an occupied bit length) of the path loss information is small, precision of feeding back based on the amplitude and the phase is higher.

It should be noted that when the feedback information includes the second bitmap, the feedback information may alternatively not include the first bitmap. For example, when values of all bits in the second bitmap are 0, it may indicate that the sensing measurement result in the group corresponding to the second bitmap is not fed back. If values of all bits in a second bitmap are 0, the transmitter may continue to read a second bitmap corresponding to a subsequent group. For example, when a value of one or more bits in the second bitmap is 1, it indicates that the sensing measurement result in the group corresponding to the second bitmap is fed back. In other words, the transmitter may learn, based on the second bitmap, whether the group corresponding to each second bitmap feeds back the sensing measurement result.

Certainly, to help the transmitter learn that the feedback information includes the first bitmap and the second bitmap, optionally, the feedback information may further include information indicating a bitmap included in the feedback information, that is, the information may indicate that the feedback information includes the first bitmap, or includes the second bitmap, or includes the first bitmap and the second bitmap. Details are not described herein.

Table 9 shows a comparison between the no compression mode and the compression mode in which a fixed quantity of sampling points are used as a unit according to embodiments of this application. A moving chair is selected as a sensing target in an office environment. The preceding two compression modes are used to report sensing measurement results in 10 snapshots. As shown in Table 9, when the compression mode is no compression, the sensing measurement results in the 10 snapshots need a length of 3000 bytes (both a real part and an imaginary part of each tap are represented by 12 bits), and a compression rate is 1, that is, no compression is performed. When the compression mode is the compression mode in which a fixed quantity of sampling points are used as a unit (in this simulation, each group of taps include only one tap, both a real part and an imaginary part of a reference tap are represented by 12 bits, and both a real part difference and an imaginary part difference of differential information are represented by 8 bits), when the first threshold is $10^{-5}$ (namely, $1e^{-5}$), the sensing measurement results in the 10 snapshots need a length of 985 bytes, and a compression rate is 0.3283; or when the first threshold is $5*10^{-5}$ (namely, $5e^{-5}$), the sensing measurement results in the 10 snapshots need a length of 550 bytes, and a compression rate is 0.1833. A lower compression ratio indicates lower bit overheads used for feeding back a CIR parameter. It can be learned from Table 9 that according to the method provided in this application, signaling overheads of the CIR parameter are effectively reduced.

TABLE 9

| | Feedback size of 10 snapshots (feedback size of 10 snapshots) (Bytes) | | Compression ratio (compression ratio) |
|---|---|---|---|
| No compression | 3000 | | 1 |
| Compression mode based on this solution | Thres = $1e^{-5}$ | 985 | 0.3283 |
| | Thres = $5e^{-5}$ | 550 | 0.1833 |

Figure 8:
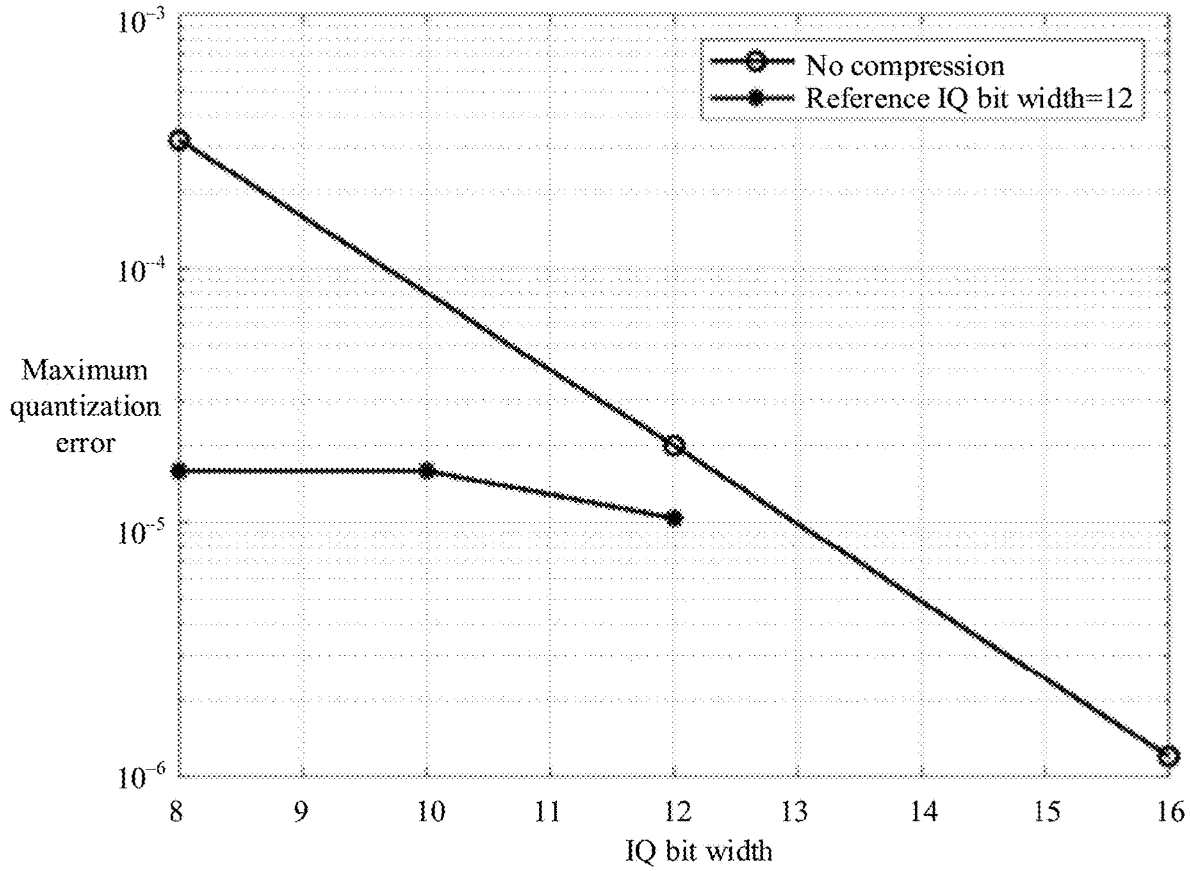
FIG. 8 is a diagram of a simulation result according to an embodiment of this application.

FIG. 8 is a diagram of a simulation result according to an embodiment of this application. In the simulation diagram (a simulation condition is the same as that in Table 9), the line with the black circle indicates that no compression is performed (No compression shown in FIG. 8), and the line with the black asterisk indicates a compression mode of sampling a fixed quantity of sampling points. For example, a quantity of taps in each group is 1, and a threshold is $1e^{-}5$. The sensing measurement result shown in FIG. 8 is obtained through single-antenna measurement. When the compression mode is no compression, a horizontal coordinate represents bit widths of a real part and an imaginary part, and may also be understood as bit widths of an in-phase component (in-phase component) and a quadrature component (quadrature component) (IQ bit widths). When the compression mode of sampling a fixed quantity of sampling points is used, the horizontal coordinate represents bit widths of a real part and an imaginary part of the differential information, or bit widths of an in-phase component and a quadrature component of the differential information (Reference IQ bit width shown in FIG. 8). The reference information in this solution uses 12 bits. A vertical coordinate indicates a maximum quantization error (maximum quantization error). It can be learned from FIG. 8 that, when 12-bit quantization is used, a maximum quantization error in the no compression solution is $2e^{-}5$, while in this solution, when 8 bits are used to represent the bit widths of the real part and the imaginary part of the differential information, a maximum quantization error is $1.6e^{-5}$. Therefore, in this solution, feedback overheads are greatly reduced without increasing a quantization error.

In embodiments of this application, the transmitter sends the control information to the receiver, so that the receiver can process the original CIR parameter based on the control information, for example, obtain the CIR parameter information in the threshold-based feedback manner. In other words, the CIR parameter information is obtained in the threshold-based feedback manner. The sensing measurement result is processed (for example, processed in the threshold-based feedback manner) to obtain the CIR parameter information, and then the CIR parameter information is fed back, to effectively reduce signaling overheads. In addition, the receiver performs processing based on the control information sent by the transmitter, and then the receiver sends the feedback information. This effectively improves a UWB pulse-based sensing procedure and ensures communication efficiency of both communication parties.

In the method shown in FIG. 3, in an embodiment, the control information further includes second control information, and the second control information may include information indicating a quantity of time subunits included in one time unit. The time unit may be understood as duration of interaction between one piece of control information and one piece of feedback information. Alternatively, a process in which the receiver completes one independent sensing measurement and feedback information reporting may be referred to as a time unit. Alternatively, a time unit may be understood as duration in which the transmitter initiates a sensing procedure and obtains the feedback information. For example, one time unit may include a plurality of time subunits. In other words, a plurality of time subunits may form one time unit. For example, one time unit may include T time subunits, where T is a positive integer.

In an example, the quantity of time subunits may indicate a periodicity of the feedback information. For example, the quantity of time subunits is in direct proportion to the periodicity of the feedback information. In an example, the quantity of time subunits may further indicate sending time of the feedback information. For example, the sending time of the feedback information may be located in last one or more time subunits in one time unit. In an example, the quantity of time subunits may further indicate a periodicity of the sensing procedure performed by the transmitter and the receiver. For example, the time unit may also be referred to as a sensing time unit or a sensing round (sensing round), and the time subunit may also be referred to as a sensing time subunit or a sensing slot (sensing slot). Specific names of the time unit and the time subunit are not limited in embodiments of this application. It may be understood that the following description of the sensing round is also applicable to the sensing time unit, and the following description of the sensing slot is also applicable to the sensing time subunit.

Figure 5:
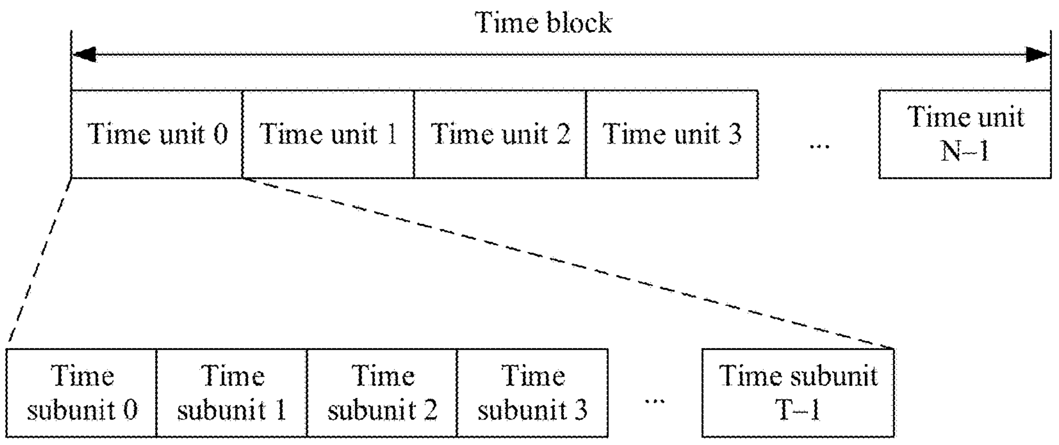
FIG. 5 is a diagram of a relationship among a time block, a time unit, and a time subunit according to an embodiment of this application.

Because the transmitter and the receiver may perform a plurality of sensing procedures, a time block is further provided in embodiments of this application. As shown in FIG. 5, one time block may include N time units, where N is a positive integer, and one time unit may include M time subunits. It may be understood that the time block may also be referred to as a sensing time block, a UWB-based sensing time block, a sensing block (sensing block), or the like. A specific name of the time block is not limited in embodiments of this application. For ease of description, the following uses the sensing block, the sensing round, and the sensing slot shown in FIG. 6 as an example to describe the method provided in embodiments of this application. It may be understood that for descriptions of FIG. 6, refer to FIG. 5.

For example, the sensing block may be a period of time specially used for sensing, each sensing block may be divided into several sensing rounds, and each sensing round may be used to complete one independent sensing measurement and result reporting. Each sensing round may be divided into several sensing slots, and each sensing slot may be used to transmit at least one sensing packet (used for sensing). One sensing slot may correspond to one or more sensing packets. Therefore, the receiver may perform sensing on the target for a plurality of times in one sensing round. Based on the sensing packet, the receiver can obtain information such as the path loss information, the delay, the AOZ, and the AOA. It may be understood that each sensing packet may include one or more UWB pulses.

Figure 6:
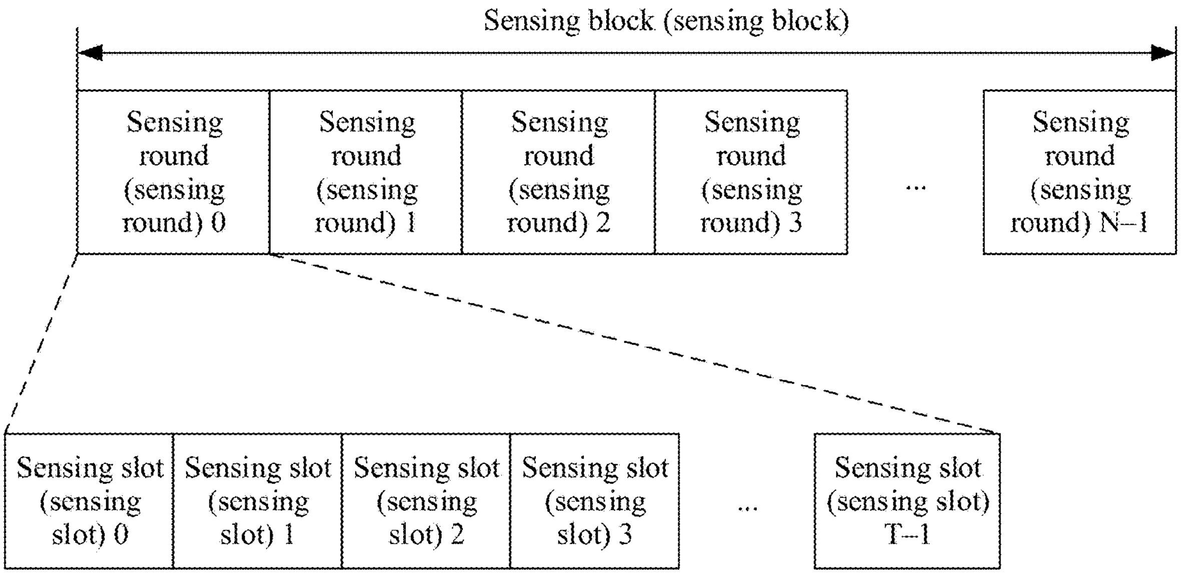
FIG. 6 is a diagram of a relationship among a sensing block, a sensing round, and a sensing slot according to an embodiment of this application.

For example, content of the second control information may be shown in Table 10a. As shown in Table 10a, the second control information may include sensing block duration, sensing round duration, sensing slot duration, and a pulse repetition frequency (PRF). Duration of each sensing slot may be the same, and duration of each sensing round may be the same. The duration shown in embodiments of this application may also be referred to as a time period, a time length, or the like. A quantity of sensing blocks included in one sensing round may be learned by using the sensing block duration and the sensing round duration. As shown in FIG. 6, one sensing block may include N sensing rounds, where N is a positive integer. A quantity of sensing slots included in one sensing round may be learned by using the sensing round duration and the sensing slot duration. As shown in FIG. 6, one sensing round may include T sensing slots, where T is a positive integer.

TABLE 10a

| Field (field) | Size (size) | Description (description) |
|---|---|---|
| Sensing block duration (sensing block duration) | 3 bytes (octets) | Unsigned integer |
| Sensing round duration (sensing round duration) | 1 byte (octet) | Unsigned integer |
| Sensing slot duration (sensing slot duration) | 2 bytes (octets) | Unsigned integer |
| Pulse repetition frequency (PRF) | 4 bits (bits) | Pulse repetition frequency |

With reference to the method shown in FIG. 3, the sensing measurement result fed back by using the feedback information may be a sensing measurement result obtained by the receiver by performing sensing on the target in one sensing round. In other words, what is fed back by using the feedback information may be the sensing measurement result obtained in the current sensing round. The feedback information fed back in the current sensing round may include a sensing measurement result in the reference sampling unit in the current sensing round. For example, the sensing measurement result in the snapshot 1 may be used as reference information of the sensing measurement result fed back in the current sensing round. Alternatively, the feedback information fed back in the current sensing round may not include the sensing measurement result in the reference sampling unit, for example, a sensing measurement result in a reference sampling unit included in feedback information fed back in a previous sensing round is used as reference information of the sensing measurement result fed back in the current sensing round.

With reference to the method shown in FIG. 3, the sensing measurement result fed back by using the feedback information may alternatively be a sensing measurement result obtained by the receiver by performing sensing on the target in a plurality of sensing rounds. In other words, the receiver may feed back sensing measurement results in a plurality of sensing rounds by using one piece of feedback information. In this case, the feedback information may also include reference information or may not include reference information. Details are not described herein again.

Because the transmitter sends control information in each sensing round, the second control information may further include information indicating whether the sensing measurement result is fed back in the current sensing round. Whether the sensing measurement result is fed back in the current sensing round is indicated, so that the receiver can effectively learn whether the sensing measurement result is fed back in the current sensing round. If the sensing measurement result does not need to be fed back in the current sensing round, the receiver may first buffer the sensing measurement result in the current sensing round, and when receiving an indication that the sensing measurement result needs to be fed back, feed back the sensing measurement result that is not fed back to the transmitter in one piece of feedback information. Therefore, in Table 8a to Table 8d, an indication of a sensing round may be further added, and the leftmost part in Table 8a to Table 8d may be replaced with: tap N_tap of CIR in snapshot N_snapshot in sensing round N_round, where Num_round indicates a quantity of sensing rounds, N_snapshot indicates a quantity of snapshots in each sensing round, and N_tap indicates a quantity of taps in each snapshot. It is assumed that each sensing round includes a same quantity of snapshots, and each snapshot includes a same quantity of taps.

For example, with reference to Table 10a and the information indicating whether the sensing measurement result is fed back in the current sensing round, the second control information may be shown in Table 10b.

TABLE 10b

| Field (field) | Size (size) | Description (description) |
|---|---|---|
| Sensing block duration (sensing block duration) | 3 bytes (octets) | Unsigned integer |
| Sensing round duration (sensing round duration) | 1 byte (octet) | Unsigned integer |
| Sensing slot duration (sensing slot duration) | 2 bytes (octets) | Unsigned integer |
| Pulse repetition frequency (PRF) | 4 bits (bits) | Pulse repetition frequency |
| Indicator for CIR update (indicator for CIR update) | 2 bits (bits) | 00: the CIR differential information is fed back<br>01: the CIR reference information and the difference are fed back<br>10: the CIR is not fed back in the current sensing round<br>11: reserved |
| Indicator for CIR update (indicator for CIR update) | 2 bits (bits) | 00: the CIR differential information is fed back<br>01: the CIR reference information and the difference are fed back<br>10: the CIR is not fed back in the current sensing round<br>11: threshold-based compression mode |

It may be understood that last two rows in Table 10b are parallel solutions, only one of the solutions may be used in determined feedback information, and the two solutions does not need to coexist. For example, when a value of a field in which the indicator for CIR update is located is 00, both the two solutions indicate that the CIR differential information is fed back. In other words, the feedback information does not need to include the sensing measurement result in the reference sampling unit, that is, reference information in previous feedback information having reference information is reference information of current feedback information. FIG. 7*b* shows a measurement report phase when the indicator for CIR update is 00. In the feedback information, the differential information indicates the sensing measurement result obtained by the receiver. For example, the CIR parameter information is determined based on the original CIR parameter and reference information that is in the feedback information and that is earlier than the feedback information.

For example, when a value of a field in which the indicator for CIR update is located is 01, both the two solutions indicate that the CIR differential information and the difference are fed back. FIG. 7*c* shows a measurement report phase when the indicator for CIR update is 01. In the feedback information, the differential information and the reference information indicate the sensing measurement result obtained by the receiver. For example, the CIR parameter information is determined based on reference information in the feedback information and the original CIR parameter.

When a value of a field in which the indicator for CIR update is located is 00 or 01, a corresponding compression mode may include any one of a threshold-based compression mode, a snapshot-based compression mode, or a clustering (clustering)-based compression mode. In addition, information indicating any one of the threshold-based compression mode, the snapshot-based compression mode, or the clustering (clustering)-based compression mode may be further added to the first control information shown in Table 6. If the added information indicates the threshold-based compression mode, the first control information may be shown in Table 6. If the added information indicates the snapshot-based compression mode or the clustering-based compression mode, other content of the first control information is not limited in embodiments of this application. For example, when a value of a field in which the indicator for CIR update is located is 10, both the two solutions indicate that the CIR is not fed back in the current sensing round, that is, it indicates that the sensing measurement result may not be fed back in the sensing round in which the control information is located. For example, when a value of a field in which the indicator for CIR update is located is 11, the first solution may be reserved, and the second solution indicates that the compression mode used in the current sensing round is the threshold-based compression mode. Therefore, the corresponding first control information may be shown in Table 6.

For example, the snapshot-based compression mode is described as follows.

For example, a snapshot (for example, a snapshot 1 of a first antenna in antennas used when the sensing measurement result is measured) in any one of one or more sensing rounds that need to be fed back by an antenna in one or more antennas may be used as a reference sampling unit, and parameter information in the reference sampling unit is used as reference information. For example, the receiver receives a UWB signal via a plurality of antennas, and needs to feed back a sensing measurement result in a current sensing round (for example, one sensing round). Therefore, the receiver may use, as reference information, a sensing measurement result in a first snapshot in a local sensing round that needs to be fed back by an antenna. A difference between a sensing measurement result in another snapshot and the reference information is used as differential information.

For example, the clustering-based compression mode is described as follows.

CIRs of all snapshots are clustered. For example, the path loss information may be clustered based on a dynamic range, a K-mean (K-mean), or density-based spatial clustering of applications with noise (DBSCAN), and a specific implementation of clustering is not limited in embodiments of this application. Then, a tap (namely, a reference tap) is selected from each cluster as a reference sampling unit, a sensing measurement result in the reference sampling unit is used as reference information, and a difference between another tap (namely, a normal tap) in each cluster and the tap used as the reference information (referring to a difference between parameters of the corresponding taps) is used as differential information. For example, a tap may be selected from a cluster 1 as reference information of the cluster 1, so that another tap in the cluster 1 is differentiated from the reference tap, and a tap is selected from a cluster 2 as reference information of the cluster 2, so that another tap in the cluster 2 is differentiated from the reference tap. Examples are not enumerated herein.

Figure 7A:
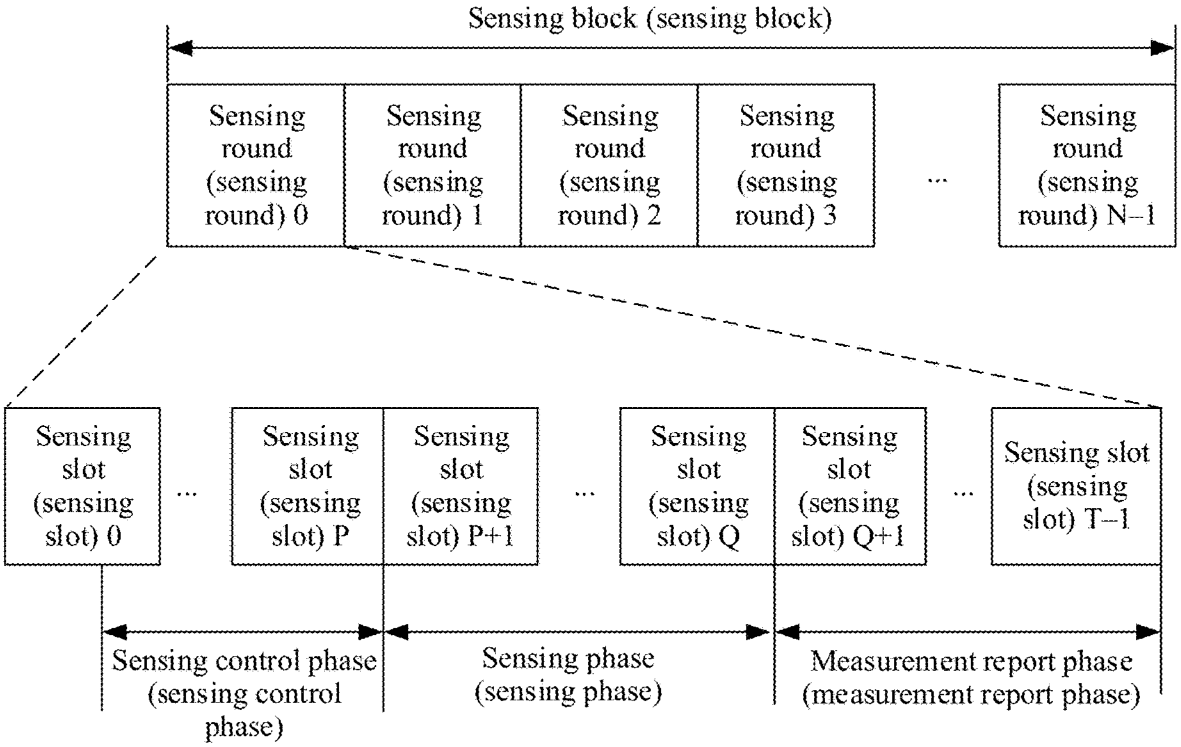
FIG. 7*a* is a diagram of a sensing procedure according to an embodiment of this application.
Figure 7B:
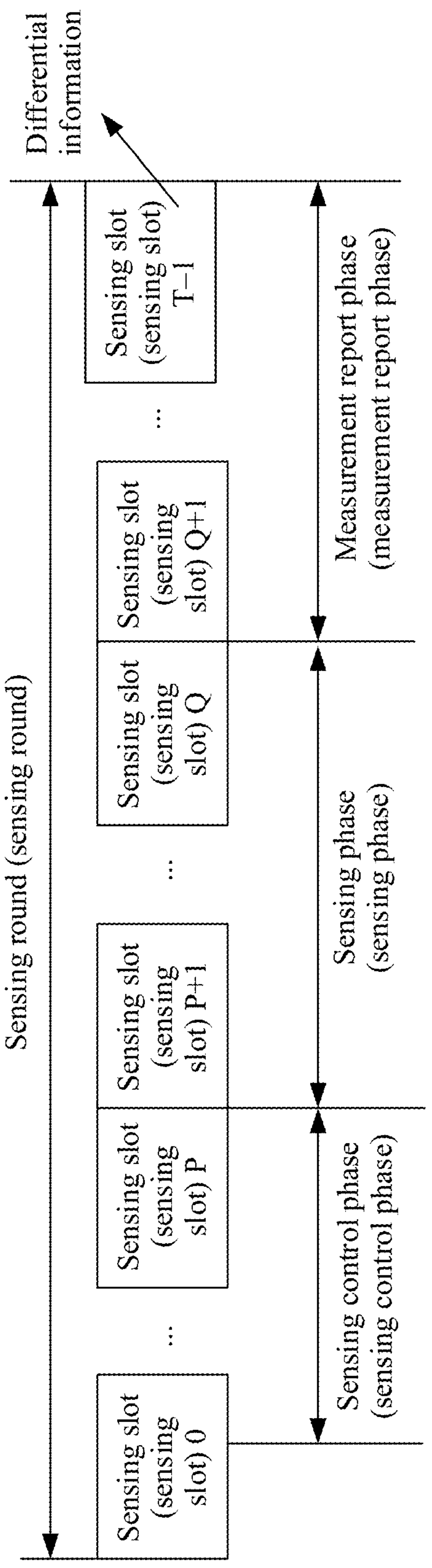
FIG. 7*b* is a diagram of a sensing procedure according to an embodiment of this application.
Figure 7C:
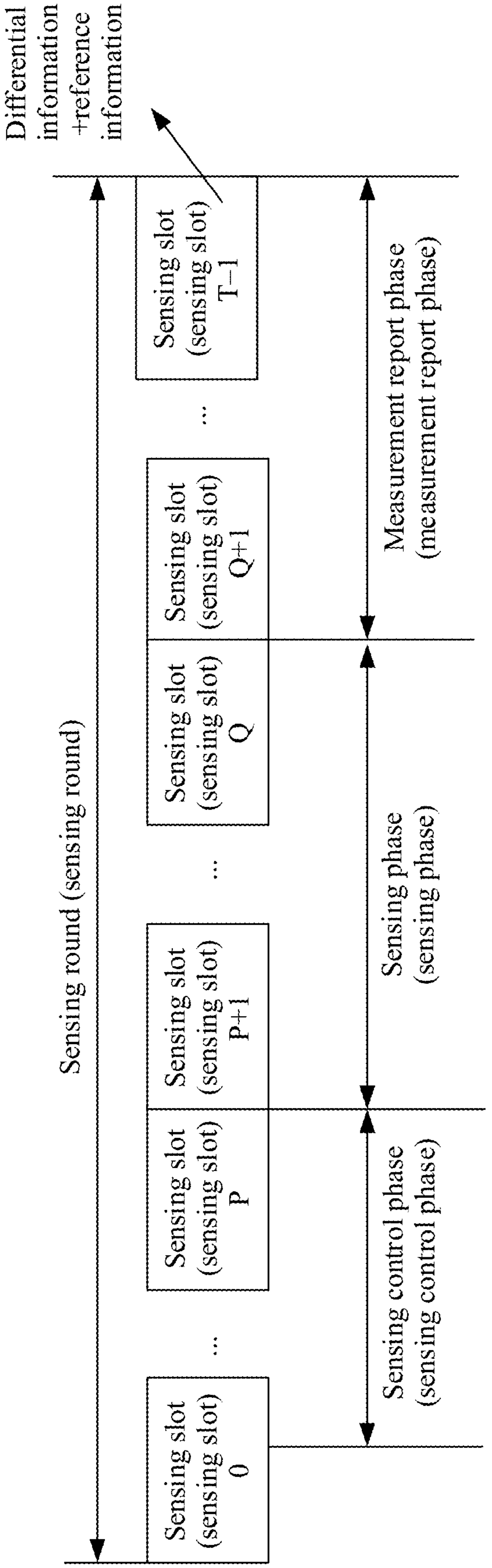
FIG. 7*c* is a diagram of a sensing procedure according to an embodiment of this application.

FIG. 7*a* is a diagram of performing a sensing procedure in a sensing round according to an embodiment of this application. As shown in FIG. 7*a*, in a sensing control phase (sensing control phase), a transmitter may send control information (which may also be referred to as sensing control information (sensing control message)) to a receiver; in a sensing phase (sensing phase), the transmitter may send a plurality of sensing packets to the receiver; and in a measurement report phase (measurement report phase), the receiver may send feedback information (which may also be referred to as measurement information, measurement report information, or the like) to the transmitter. The sensing control phase may correspond to one or more sensing slots, the sensing phase may correspond to a plurality of sensing slots, and the measurement report phase may correspond to one or more sensing slots. In FIG. 7*a*, P is a positive integer less than Q, and Q is a positive integer less than M. For example, P+1 is less than Q, and Q+1 is less than or equal to M−1.

In an embodiment, when a moving speed of a target is high, the receiver may perform feedback more frequently, so that the transmitter can obtain information related to the target in time. When the moving speed of the target is low, a frequency of feeding back a sensing measurement result can be reduced. Because the feedback information needs to be fed back in last one or more sensing slots in one sensing round, a periodicity of the feedback information or a feedback frequency of the feedback information may be indicated by using a quantity of sensing slots included in one sensing round in the control information. The quantity of sensing slots is in direct proportion to the periodicity of the feedback information, and the quantity of sensing slots is in inverse proportion to the feedback frequency of the feedback information. A larger quantity of sensing slots indicates a longer periodicity of the feedback information or a lower feedback frequency of the feedback information.

For example, when the transmitter requires the receiver to feed back the sensing measurement result more frequently, the quantity of sensing slots included in one sensing round indicated in the control information may be reduced, so that the periodicity of the feedback information is shortened or the feedback frequency of the feedback information is increased. For example, the transmitter may obtain a relationship between the periodicity of the feedback information and a change frequency of the target according to a specific detection algorithm, so that after receiving the feedback information, the transmitter determines a feedback periodicity of subsequent feedback information according to the detection algorithm.

For a part that is not described in detail in one of the foregoing implementations, refer to another implementation. Details are not described herein again. In addition, the foregoing implementations may be combined with each other.

It can be learned from the foregoing that the feedback information in embodiments of this application includes the first bitmap and/or the second bitmap. Therefore, the first control information may be further understood as indicating to feed back the sensing measurement result in a bitmap mode. The feeding back the sensing measurement result in a bitmap mode shown in embodiments of this application may include: feeding back a differential sensing measurement result in a bitmap mode (for example, feeding back the original CIR parameter in a bitmap mode and the reference information), or feeding back a non-differential sensing measurement result in a bitmap mode (that is, feeding back the original CIR parameter in a bitmap mode).

In an example, the first control information may include indication information, and the indication information indicates whether to feed back the sensing measurement result in a bitmap mode (bitmap).

For example, as shown in Table 11, the first control information may include the indication information.

TABLE 11

| Value of indication information | Description |
|---|---|
| 0 | CIR feedback is not performed in a bitmap mode |
| 1 | CIR feedback is performed in a bitmap mode |

For example, when the value of the indication information is 0, it indicates that the sensing measurement result is not fed back in a bitmap mode (or the CIR feedback is not performed in a bitmap mode). For another example, when the value of the indication information is 1, it indicates that the sensing measurement result is fed back in a bitmap mode (or the CIR feedback is performed in a bitmap mode).

In another example, the first control information may not include the indication information. For example, the first control information may indicate to feed back the sensing measurement result in a bitmap mode.

As shown above, the first control information may include information about a first threshold. For example, the first control information may include a plurality of first thresholds, and after receiving the first control information, the receiver may select one first threshold from the plurality of first thresholds. In this case, the feedback information may include the first threshold selected by the receiver. For example, in addition to being included in the first control information, the first threshold may be further determined by the receiver. For example, a value of the first threshold may be in direct proportion to thermal noise $P_n$=kTB of the receiver, where k represents a Boltzmann constant, T represents a Kelvin temperature (generally 290 K at a room temperature), and B represents a signal bandwidth. For example, when the bandwidth B is large or the temperature T is high, the first threshold may be set to a large value; or when the bandwidth B is small or the temperature T is low, the first threshold may be set to a small value. When the first threshold is determined by the receiver, the feedback information may include the information about the first threshold. Certainly, the first control information may further include one first threshold. The first threshold shown in embodiments of this application may be greater than or equal to 0.

For example, the first threshold may be used to determine, based on the sensing measurement result in the reference sampling unit, whether to feed back sensing measurement results in one or more non-reference sampling units, and the first threshold may be further used to determine whether to feed back a sensing measurement result of a group of sampling points in a sampling unit. The sensing measurement result of a group of sampling points may be original CIR parameter information or CIR parameter information obtained based on the difference. Alternatively, the first threshold may be further used to determine whether to feed back a sensing measurement result of some sampling points corresponding to a reference path (as shown in FIG. 12*a* to FIG. 12*d* below).

Figure 12A:
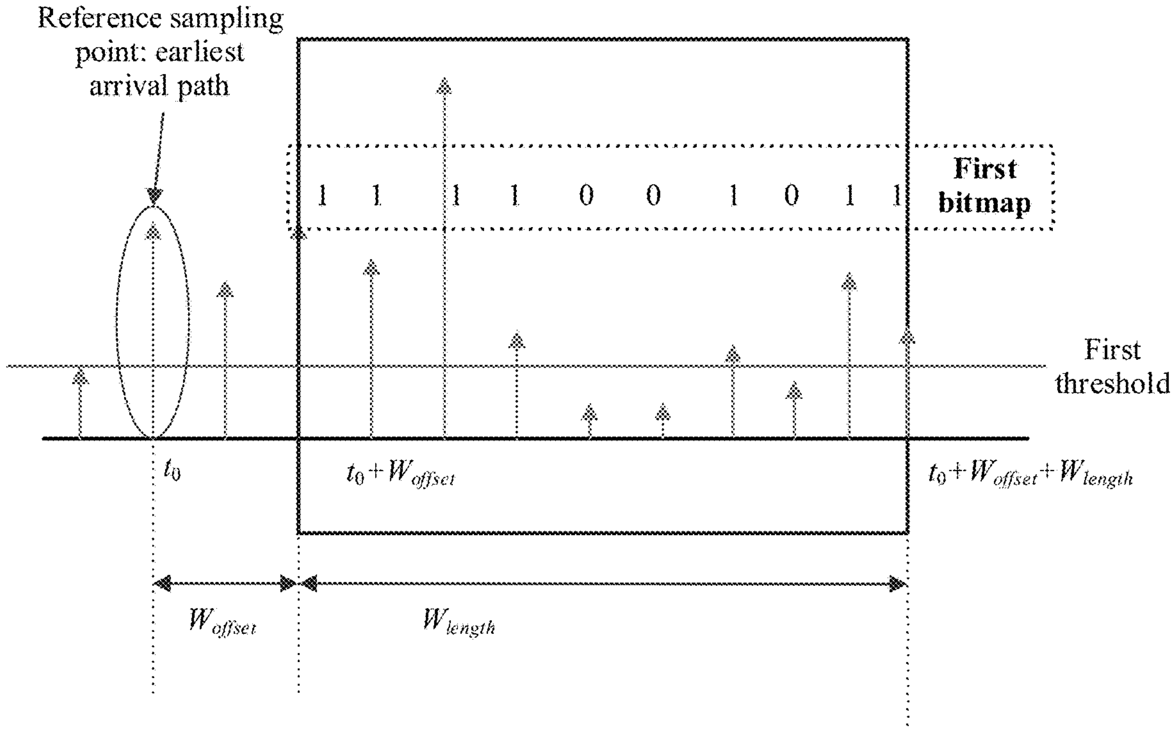
FIG. 12*a* is a diagram of performing feedback by using an earliest arrival path as a reference according to an embodiment of this application.
Figure 12B:
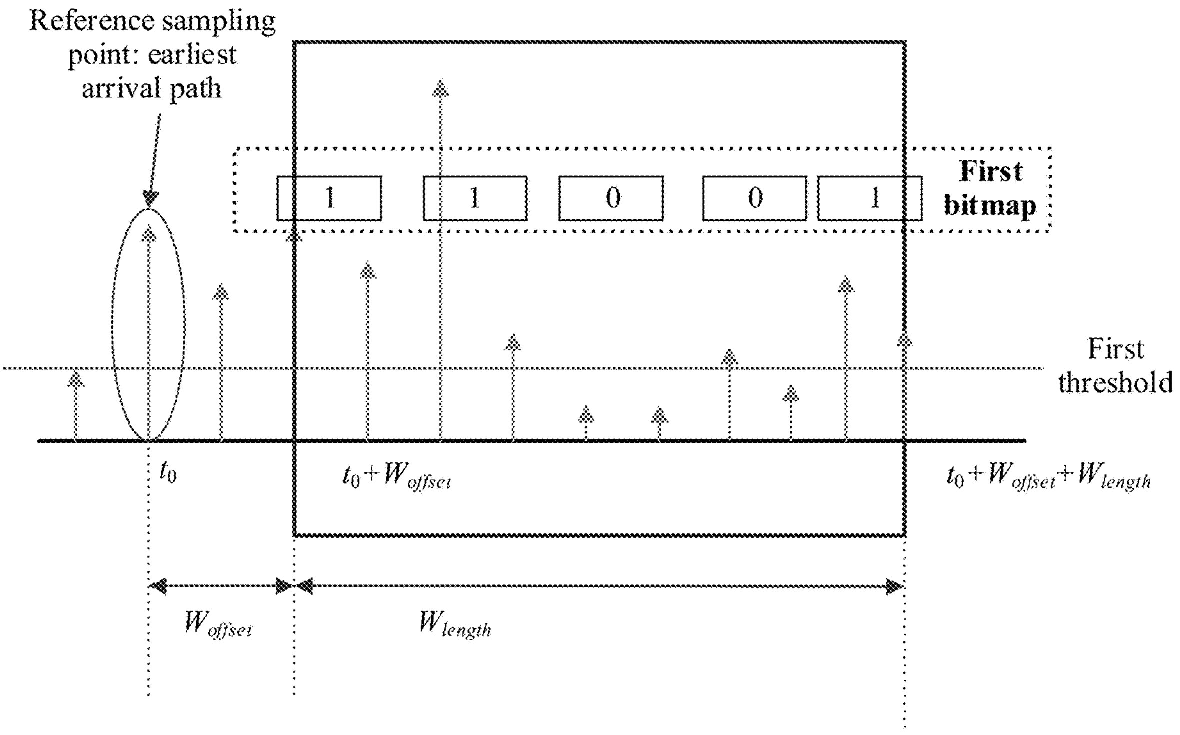
FIG. 12*b* is a diagram of performing feedback by using an earliest arrival path as a reference according to an embodiment of this application.
Figure 12C:
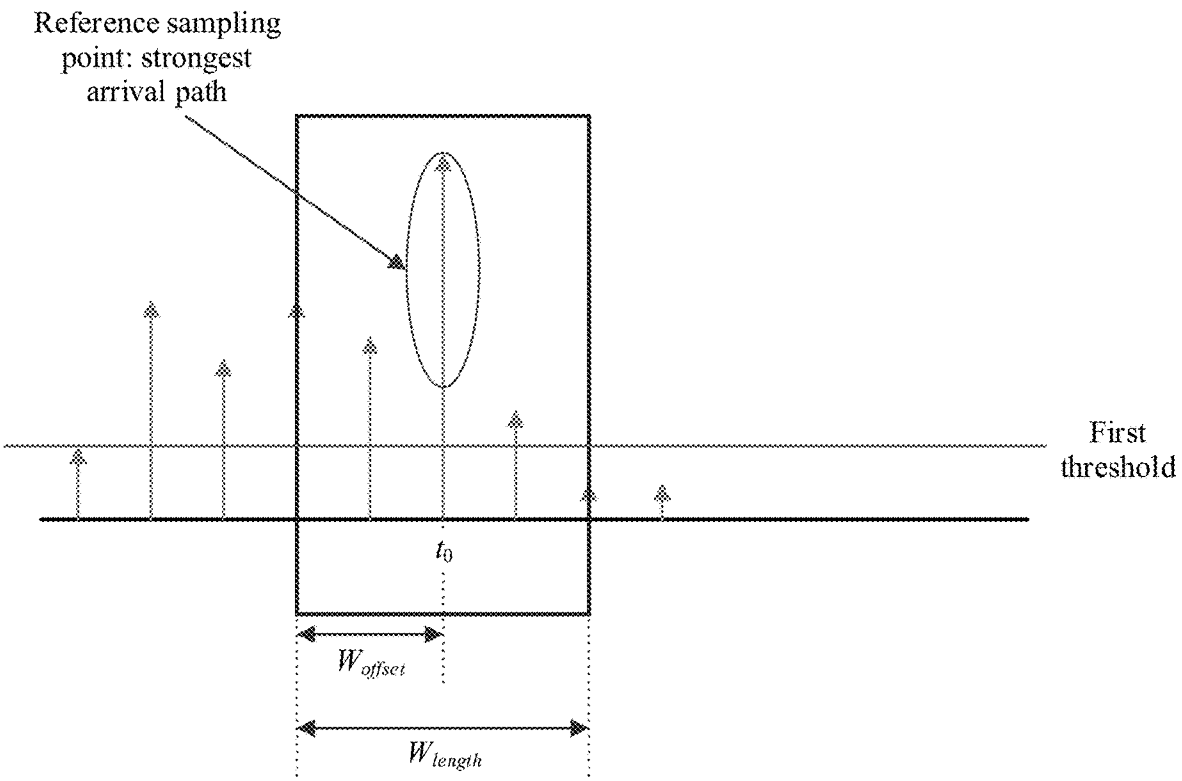
FIG. 12*c* is a diagram of performing feedback by using a strongest arrival path as a reference according to an embodiment of this application.
Figure 12D:
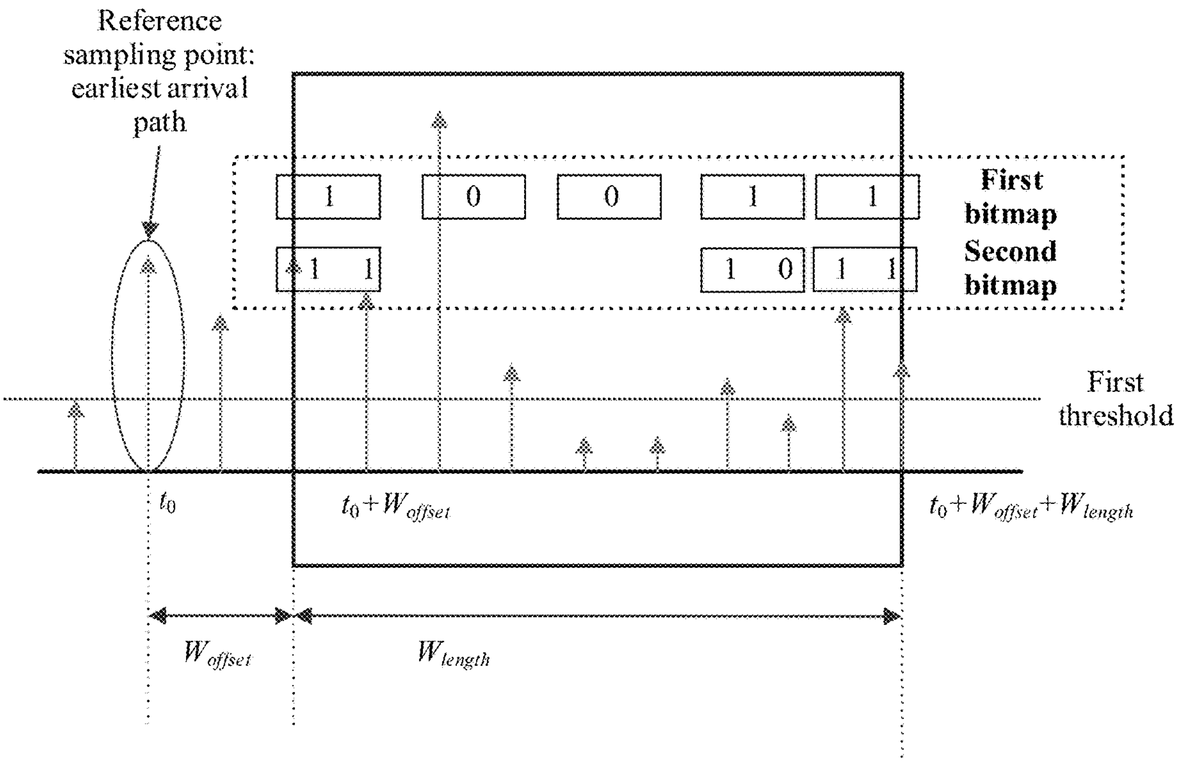
FIG. 12*d* is a diagram of performing feedback by using an earliest arrival path as a reference according to an embodiment of this application.

For example, because the feedback information may be used to feed back the sensing measurement result in a bitmap mode, the first control information may further include length information of a bitmap and position information of a corresponding sampling point. For example, the length information of the bitmap may include a window length ($W_{length}$), and the position information of the corresponding sampling point includes a reference path (or referred to as a position of a reference path, a reference sampling point, or the like), and a window offset ($W_{offset}$) (or referred to as an offset) of a start position of a window relative to the reference path. In an embodiment, the first control information may further include a sampling rate fs. The sampling rate may be used to determine a time interval Ts between adjacent sampling points, for example, Ts=1/fs. For example, as shown in FIG. 12*a*, FIG. 12*b*, and FIG. 12*d*, a position of a reference sampling point may include a position of an earliest arrival path; or as shown in FIG. 12*c*, a position of a reference sampling point may include a position of a strongest arrival path. It may be understood that the position of the strongest arrival path may be in the window, or may be outside the window. This is not limited in embodiments of this application. In embodiments of this application, a manner of obtaining the strongest arrival path or the earliest arrival path is used as a feasible example, and details are as follows: For example, when two communication parties perform sensing measurement for the first time, a window length may be greater than or equal to a value, so that the receiver can learn an approximate position of the strongest arrival path or the earliest arrival path (or may learn an approximate range of the target), that is, learn prior information. Then, the window may continue to be adjusted subsequently based on the prior information, for example, to be less than the foregoing value. A specific value of the window length is not limited in embodiments of this application. For example, the window length may be a fixed value, for example, a compression mode in which a fixed quantity of sampling points are used as a unit is used (or a fixed quantity of sampling points are used as a feedback). For another example, the window length may be a variable value, for example, a compression mode in which a variable quantity of sampling points are used as a unit is used (or a variable quantity of sampling points are used as a feedback). For specific descriptions of the feedback manner, refer to the foregoing descriptions. Details are not described herein again.

For example, when the sensing measurement result is fed back in a windowing manner, in an example, when the first control information includes the length of the bitmap and the position information of the corresponding sampling point, the feedback information may not include the length information. In another example, when the first control information does not include the length of the bitmap and the position information of the corresponding sampling point, the feedback information may include the length of the bitmap and the position information of the corresponding sampling point. In still another example, regardless of whether the first control information includes the foregoing information, the feedback information may include the length of the bitmap and the position information of the corresponding sampling point.

For example, because the feedback information may include two bitmaps, the first control information may further include N and P. N may be a total quantity of taps that need to be fed back (when a feedback is performed in a windowing manner, N is equal to the window length), and P is a quantity of groups. For example, the receiver may group the N taps into P groups based on the first control information, and each group includes M taps. When P cannot be exactly divided by N, N may be padded with zeros to an integer multiple of P (that is, in a bitmap corresponding to a last group, a bit representing last P-Q taps is 0, and Q is a modulo operation performed by N on P), and then P groups are obtained through grouping. For example, when the first control information includes information about N and P, the feedback information may not include the information about N and P; or when the first control information does not include the information about N and P, the feedback information may include the information about N and P; or regardless of whether the first control information includes the information about N and P, the feedback information may include the information about N and P.

As shown above, the first control information may include information about a compression mode, and Table 12 may be further obtained based on Table 4.

TABLE 12

| Value of a field in which a compression mode is located | Description |
|---|---|
| 00 | No compression |
| 01 | A group of fixed quantity of taps are used as a unit. If a sensing measurement result (which may be an original CIR or a differential CIR) of each tap in the group is less than the first threshold, sensing measurement results of the group of taps are not fed back. If a sensing measurement result of a tap in the group is greater than the first threshold, the sensing measurement results of the group of taps need to be fed back. |
| 10 | A group of variable quantity of taps are used as a unit. If a sensing measurement result (which may be an original CIR or a differential CIR) of each tap in the group is less than the first threshold, sensing measurement results of the group of taps are not fed back. If a sensing measurement result of a tap in the group is greater than the first threshold, the sensing measurement results of the group of taps need to be fed back. |

A group of taps shown in Table 12 may be determined based on a length of the bitmap shown above. For example, a quantity N of taps in the group of taps may be equal to a window length, that is, $N=W_{length}$. For example, all taps in the group of taps may be included in one snapshot.

In an example, if a tap in a snapshot (which may be a windowed CIR (for example, a CIR determined based on the window length, the window offset, and the like shown above), or may be an unwindowed CIR) is less than the first threshold, the corresponding tap is not fed back, or a sensing measurement result (for example, the sensing measurement result includes path loss information and a delay, or may further include an AOA and a ZOA) corresponding to the tap is not fed back. In other words, when it is determined not to feed back the sensing measurement result of the tap, it indicates that an amplitude corresponding to the tap is excessively small, and has little impact on a sensing result. Therefore, no feedback may be performed. This effectively reduces signaling overheads without affecting obtaining of the information related to the target by the transmitter. It may be understood that the description that the tap is less than the first threshold in embodiments of this application may be understood as follows: A CIR parameter corresponding to the tap is less than the first threshold.

In another example, taps in a snapshot (which may be a windowed CIR, or may be an unwindowed CIR) are grouped into P groups, and each group includes M taps. If T taps in a group are less than the first threshold, the taps in the corresponding group are not fed back, or a sensing measurement result corresponding to the group is not fed back (for example, the sensing measurement result includes path loss information and a delay, or may further include an AOA and a ZOA). In other words, when it is determined not to feed back sensing measurement results of taps in the group, it indicates that amplitudes corresponding to the group of taps are excessively small, and have little impact on a sensing result. Therefore, no feedback may be performed. This effectively reduces signaling overheads without affecting obtaining of the information related to the target by the transmitter. T may be a positive integer less than or equal to M.

For example, as shown in FIG. 12*a* and FIG. 12*b*, the feedback information may include a first bitmap, and the first bitmap may indicate whether to feed back a sensing measurement result of a corresponding tap in a group. For example, the receiver may determine the start position of the window based on the position of the earliest arrival path and the window offset, and then determine the position of the window based on the window length and the start position of the window. The tap in the window is the tap in the group. As shown in FIG. 12*a*, a first tap, a second tap, a third tap, a fourth tap, a seventh tap, a ninth tap, and a tenth tap in the window are all greater than the first threshold. Therefore, a value of the first bitmap may be 1111 0010 11. As shown in FIG. 12*b*, after determining the position of the window, the receiver may further group taps in the window. For example, two taps are grouped into one group (merely an example). For example, a first group of taps, a second group of taps, and a fifth group of taps are all greater than the first threshold. Therefore, a value of the first bitmap may be 11001.

In still another example, taps in a snapshot (which may be a windowed CIR, or may be an unwindowed CIR) are grouped into P groups, and each group includes M taps. Two bitmaps are used to indicate CIR parameter information. When any tap in a group is greater than the first threshold, a corresponding group is fed back. Further, it is determined which tap in the group is greater than the first threshold, and a corresponding tap in the group is fed back. In other words, when it is determined not to feed back sensing measurement results of taps in the group, it indicates that amplitudes corresponding to the group of taps are excessively small, and have little impact on a sensing result. Therefore, no feedback may be performed. This effectively reduces signaling overheads without affecting obtaining of the information related to the target by the transmitter.

For example, as shown in FIG. 12*d*, a value of the first bitmap is 10011, indicating that the receiver feeds back taps in a first group, a fourth group, and a fifth group, and a value of the second bitmap is 11 10 11, separately indicating whether taps in a first group, a fourth group, and a fifth group are fed back.

For example, same CIR parameters corresponding to different taps (for example, path losses and phases of CIRs or quadrature components and in-phase components of CIRs corresponding to different taps) are quantized by using a same bit width, but corresponding amplitude ranges are different. Therefore, a scaling factor β may be used for normalization. The scaling factor is related to a transmit and receive antenna pair, and each transmit and receive antenna pair requires a scaling factor. Based on this, a table corresponding to Table 8a may be adaptively modified as shown in Table 13a.

TABLE 13a

| Field | Size (Bits) | | Description |
|---|---|---|---|
| Receive antenna identifier (rx antenna ID) | 3 bits | | Receive antenna identifier |
| Transmit antenna identifier (tx antenna ID) | 3 bits | | Transmit antenna identifier |
| Amplitude scaling factor α in a sampling unit 1 (scaling factor) | 8 bits | | Amplitudes of signals received by different antennas are different, but are represented by using a same quantization bit width. Therefore, a scaling factor needs to be used to represent an amplitude difference. A final amplitude of a tap (for example, a tap n) may be represented as an amplitude of α*tap n (an amplitude of the tap n is represented by 16 bits). |
| Position $t_0$ of a reference path in the sampling unit 1 | 8 bits | | Delay of the reference path |
| Strength $A_0$ of the reference path in the sampling unit 1 | 16 bits | | Strength of the reference path |
| Reference path indication in the sampling unit 1 | 1 bit | | 0 indicates a strongest path, and 1 indicates an earliest arrival path |
| CIR of a sampling point 1 in the sampling unit 1 (Tap 1 of CIR in snapshot 1) | In-phase component/amplitude (In-phase Component/Amplitude) | 16 | Signed integer, using a pre-agreed value as a quantization unit (Scaled to pre-agreed level, encoded as a signed integer) |
| | Quadrature component/phase (Quadrature Component/Phase) | 16 | Signed integer, using a pre-agreed value as a quantization unit |
| CIR of a sampling point 2 in the sampling unit 1 (Tap 2 of CIR in snapshot 1) | In-phase component/amplitude | 16 | Signed integer, using a pre-agreed value as a quantization unit |
| | Quadrature component/phase | 16 | Signed integer, using a pre-agreed value as a quantization unit |
| . . . | . . . | | . . . |

TABLE 13a-continued

| Field | Size (Bits) | | Description |
|---|---|---|---|
| CIR of a sampling point N_tap in a sampling unit N_snapshot (Tap N_tap of CIR in snapshot N_snapshot) | In-phase component/amplitude | 16 | Signed integer, using a pre-agreed value as a quantization unit |
| | Quadrature component/phase | 16 | Signed integer, using a pre-agreed value as a quantization unit |

For example, a table corresponding to Table 8b may be adaptively modified as shown in Table 13b.

TABLE 13b

| Subfield (subfield) | Size (size) | | Meaning (meaning) |
|---|---|---|---|
| Receive antenna identifier (rx antenna ID) | 3 bits | | Receive antenna identifier |
| Transmit antenna identifier (tx antenna ID) | 3 bits | | Transmit antenna identifier |
| Amplitude scaling factor α in a sampling unit 1 (scaling factor) | 8 bits | | Amplitudes of signals received by different antennas are different, but are represented by using a same quantization bit width. Therefore, a scaling factor needs to be used to represent an amplitude difference. A final amplitude of a tap may be represented as an amplitude of α*tap n (an amplitude of the tap n is represented by 16 bits). |
| Position $t_0$ of a reference path in the sampling unit 1 | 8 bits | | Delay of the reference path |
| Strength $A_0$ of the reference path in the sampling unit 1 | 16 bits | | Strength of the reference path |
| Reference path indication in the sampling unit 1 | 1 bit | | 0 indicates a strongest path, and 1 indicates an earliest arrival path |
| First bitmap in the sampling unit 1 | Determine a bit length based on the following information: a quantity of sampling points in each sampling unit (Tap Number Per Snapshot)/a quantity of taps in each group (Tap Number in a Group) | | Each group of taps correspond to a bit in the bitmap. If a bit is 1, it indicates that amplitudes of T taps in the group are greater than the first threshold, and the group of taps need to be fed back. If a bit is 0, it indicates that a quantity of taps whose amplitudes are greater than the threshold in the group is less than T, and the group of taps do not need to be fed back. A value of T ranges from 1 to the quantity of taps in each group. |
| Tap amplitude (amplitude) in the sampling unit 1 | Amplitude of a tap 1 (amplitude of tap 1) in a group 1 in the bitmap | 16 bits | Amplitude of the tap 1 (the amplitude (in-phase and quadrature) of tap 1) |
| | Amplitude of a tap 2 in the group 1 in the bitmap | 16 bits | Amplitude of the tap 2 |
| | . . . | . . . | . . . |
| | Amplitude of a tap M in the group 1 in the bitmap | 16 bits | Amplitude of a tap $N_{tap}$ |
| | . . . | . . . | . . . |
| | Amplitude of a tap 1 (amplitude of tap 1) in a group P in the bitmap | 16 bits | Amplitude of the tap 1 (the amplitude (in-phase and quadrature) of tap 1) |
| | Amplitude of a tap 2 in the group P in the bitmap | 16 bits | Amplitude of the tap 2 |
| | . . . | . . . | . . . |
| | Amplitude of a tap M in the group P in the bitmap | 16 bits | Amplitude of the tap M |
| Tap delay (tap phase) in | Phase of the tap 1 in the group 1 in the bitmap | 8 bits | Phase of the tap 1 |

TABLE 13b-continued

| Subfield (subfield) | Size (size) | | Meaning (meaning) |
|---|---|---|---|
| the sampling unit 1 | Phase of the tap 2 in the group 1 in the bitmap | 8 bits | Phase of the tap 2 |
| | . . . | . . . | . . . |
| | Phase of the tap M in the group 1 in the bitmap | 8 bits | Phase of the tap M |
| | . . . | . . . | . . . |
| | Phase of the tap 1 in the group P in the bitmap | 8 bits | Phase of the tap 1 |
| | Phase of the tap 2 in the group P in the bitmap | 8 bits | Phase of the tap 2 |
| | . . . | . . . | . . . |
| | Phase of the tap M in the group P in the bitmap | 8 bits | Phase of the tap M |
| . . . | . . . | . . . | . . . |
| Tap amplitude (amplitude) in a sampling unit N_snapshot | Amplitude of the tap 1 (amplitude of tap 1) in the group 1 in the bitmap | 16 bits | Amplitude of the tap 1 (the amplitude (in-phase and quadrature) of tap 1) |
| | Amplitude of the tap 2 in the group 1 in the bitmap | 16 bits | Amplitude of the tap 2 |
| | . . . | . . . | . . . |
| | Amplitude of the tap M in the group 1 in the bitmap | 16 bits | Amplitude of the tap M |
| | . . . | . . . | . . . |
| | Amplitude of the tap 1 (amplitude of tap 1) in the group P in the bitmap | 16 bits | Amplitude of the tap 1 (the amplitude (in-phase and quadrature) of tap 1) |
| | Amplitude of the tap 2 in the group P in the bitmap | 16 bits | Amplitude of the tap 2 |
| | . . . | . . . | . . . |
| | Amplitude of the tap M in the group P in the bitmap | 16 bits | Amplitude of the tap M |
| Tap phase (tap phase) in the sampling unit N_snapshot | Phase of the tap 1 in the group 1 in the bitmap | 8 bits | Phase of the tap 1 |
| | Phase of the tap 2 in the group 1 in the bitmap | 8 bits | Phase of the tap 2 |
| | . . . | . . . | . . . |
| | Phase of the tap M in the group 1 in the bitmap | 8 bits | Phase of the tap M |
| | . . . | . . . | . . . |
| | Phase of the tap 1 in the group P in the bitmap | 8 bits | Phase of the tap 1 |
| | Phase of the tap 2 in the group P in the bitmap | 8 bits | Phase of the tap 2 |
| | . . . | . . . | . . . |
| | Phase of the tap M in the group P in the bitmap | 8 bits | Phase of the tap M |

For example, a table corresponding to Table 8c may be adaptively modified as shown in Table 13c.

TABLE 13c

| Subfield (subfield) | Size (size) | Meaning (meaning) |
|---|---|---|
| Receive antenna identifier (rx antenna ID) | 3 bits | Receive antenna identifier |
| Transmit antenna identifier (tx antenna ID) | 3 bits | Transmit antenna identifier |
| Quantity of groups in a sampling unit (Group Number in a snapshot) | 8 | Quantity of groups in each snapshot, namely, M |
| Group 1 start tap index (Group 1 Start Tap Index) | 8 | Index of a start tap in a group 1 |
| Quantity of taps in the group 1 (Group 1 Tap | 8 | Total quantity of taps in the group 1 (or an index of an end tap in the group 1) |

TABLE 13c-continued

| Subfield (subfield) | Size (size) | | Meaning (meaning) |
|---|---|---|---|
| Number) (or group 1 end tap index) | | | |
| . . . | . . . | | . . . |
| Group P start tap index (Group P Start Tap Index) | 8 | | Index of a start tap in a group M |
| Quantity of taps in the group P (Group M tap Number) | 8 | | Total quantity of taps in the group M (or an index of an end tap in the group M) |
| Position $t_0$ of a reference path in a sampling unit 1 | 8 bits | | Delay of the reference path |
| Strength $A_0$ of the reference path in the sampling unit 1 | 16 bits | | Strength of the reference path |
| Reference path indication in the sampling unit 1 | 1 bit | | 0 indicates a strongest path, and 1 indicates an earliest arrival path |
| First bitmap in the sampling unit 1 | Determine a bit length based on the following information: a quantity of sampling points in each sampling unit (Tap Number Per Snapshot)/a quantity of taps in each group (Tap Number in a Group) | | Each group of taps correspond to a bit in the bitmap. If a bit is 1, it indicates that an amplitude of a tap in the group is greater than the first threshold, and the group of taps need to be fed back. If a bit is 0, it indicates that amplitudes of all taps in the group are less than the threshold, and the group of taps do not need to be fed back. |
| Tap amplitude (amplitude) in the sampling unit 1 | Amplitude of a tap 1 (amplitude of tap 1) in the group 1 in the bitmap | 16 bits | Amplitude of the tap 1 (the amplitude (in-phase and quadrature) of tap 1) |
| | Amplitude of a tap 2 in the group 1 in the bitmap | 16 bits | Amplitude of the tap 2 |
| | . . . | . . . | . . . |
| | Amplitude of a tap $M_1$ in the group 1 in the bitmap | 16 bits | Amplitude of the tap $M_1$ |
| | . . . | . . . | . . . |
| | Amplitude of a tap 1 (amplitude of tap 1) in a group P in the bitmap | 16 bits | Amplitude of the tap 1 (the amplitude (in-phase and quadrature) of tap 1) |
| | Amplitude of a tap 2 in the group P in the bitmap | 16 bits | Amplitude of the tap 2 |
| | . . . | . . . | . . . |
| | Amplitude of a tap $M_p$ in the group P in the bitmap | 16 bits | Amplitude of the tap $M_p$ |
| Tap phase (tap phase) in the sampling unit 1 | Phase of the tap 1 in the group 1 in the bitmap | 8 bits | Phase of the tap 1 |
| | Phase of the tap 2 in the group 1 in the bitmap | 8 bits | Phase of the tap 2 |
| | . . . | . . . | . . . |
| | Phase of the tap $M_1$ in the group 1 in the bitmap | 8 bits | Phase of the tap $M_1$ |
| | . . . | . . . | . . . |
| | Phase of the tap 1 in the group P in the bitmap | 8 bits | Phase of the tap 1 |
| | Phase of the tap 2 in the group P in the bitmap | 8 bits | Phase of the tap 2 |
| | . . . | . . . | . . . |
| | Phase of the tap $M_p$ in the group P in the bitmap | 8 bits | Phase of the tap $M_P$ |
| . . . | . . . | . . . | . . . |
| Tap amplitude (amplitude) in a sampling unit N_snapshot | Amplitude of the tap 1 (amplitude of tap 1) in the group 1 in the bitmap | 16 bits | Amplitude of the tap 1 (the amplitude (in-phase and quadrature) of tap 1) |
| | Amplitude of the tap 2 in the group 1 of the bitmap | 16 bits | Amplitude of the tap 2 |
| | . . . | . . . | . . . |
| | Amplitude of the tap $M_1$ in the group 1 in the bitmap | 16 bits | Amplitude of the tap $M_1$ |
| | . . . | . . . | . . . |
| | Amplitude of the tap 1 (amplitude of tap 1) in the group P in the bitmap | 16 bits | Amplitude of the tap 1 (the amplitude (in-phase and quadrature) of tap 1) |
| | Amplitude of the tap 2 in | 16 | Amplitude of the tap 2 |

TABLE 13c-continued

| Subfield (subfield) | Size (size) | | Meaning (meaning) |
|---|---|---|---|
| | the group P in the bitmap | bits | |
| | . . . | . . . | . . . |
| | Amplitude of the tap $M_p$ in the group P in the bitmap | 16 bits | Amplitude of the tap $M_P$ |
| Tap phase (phase) in the sampling unit N_snapshot | Phase of the tap 1 in the group 1 in the bitmap | 8 bits | Phase of the tap 1 |
| | Phase of the tap 2 in the group 1 in the bitmap | 8 bits | Phase of the tap 2 |
| | . . . | . . . | . . . |
| | Phase of the tap $M_1$ in the group 1 in the bitmap | 8 bits | Phase of the tap $M_1$ |
| | . . . | . . . | . . . |
| | Phase of the tap 1 in the group P in the bitmap | 8 bits | Phase of the tap 1 |
| | Phase of the tap 2 in the group P in the bitmap | 8 bits | Phase of the tap 2 |
| | . . . | . . . | . . . |
| | Phase of the tap $M_p$ in the group P in the bitmap | 8 bits | Phase of the tap $M_P$ |

For example, a table corresponding to Table 8d may be adaptively modified as shown in Table 13d.

TABLE 13d

| Subfield (subfield) | Size (size) | Meaning (meaning) |
|---|---|---|
| Receive antenna identifier (rx antenna ID) | 3 bits | Receive antenna identifier |
| Transmit antenna identifier (tx antenna ID) | 3 bits | Transmit antenna identifier |
| Quantity of groups in a sampling unit (Group Number in a snapshot) | 8 | Quantity of groups in each snapshot, namely, M |
| Group 1 start tap index (Group 1 Start Tap Index) | 8 | Index of a start tap in a group 1 |
| Quantity of taps in the group 1 (Group 1 Tap Number) (or group 1 end tap index) | 8 | Total quantity of taps in the group 1 (or an index of an end tap in the group 1) |
| . . . | . . . | . . . |
| Group P start tap index (Group P Start Tap Index) | 8 | Index of a start tap in a group M |
| Quantity of taps in the group P (Group M tap Number) | 8 | Total quantity of taps in the group M (or an index of an end tap in the group M |
| Position $t_0$ of a reference path in the sampling unit 1 | 8 bits | Delay of the reference path |
| Strength $A_0$ of the reference path in the sampling unit 1 | 16 bits | Strength of the reference path |
| Reference path indication in the sampling unit 1 | 1 bit | 0 indicates a strongest path, and 1 indicates an earliest arrival path |
| First bitmap in the sampling unit 1 | Determine a bit length based on the following information: a quantity of sampling points in each sampling unit (Tap Number Per Snapshot)/a quantity of taps in each group | Each group of taps correspond to a bit in the bitmap. If a bit is 1, it indicates that an amplitude of a tap in the group is greater than the first threshold, and the group of taps need to be fed back. If a bit is 0, it indicates that amplitudes |

TABLE 13d-continued

| Subfield (subfield) | Size (size) | | Meaning (meaning) |
|---|---|---|---|
| | (Tap Number in a Group) | | of all taps in the group are less than the threshold, and the group of taps do not need to be fed back. |
| Second bitmap in the sampling unit 1 | If a value of a bit corresponding to the group 1 in the first bitmap is 1, a second bitmap is further determined in the group 1, where a bit length is equal to a total quantity of taps in the group 1. | | The first bitmap is used to determine a group of taps that need to be fed back, and the second bitmap is used to determine a specific tap in the group that needs to be fed back. |
| Tap amplitude (amplitude) in the sampling unit 1 | Amplitude of a tap 1 (amplitude of tap 1) in a first group of second bitmaps in the first bitmap | 16 bits | Amplitude of the tap 1 (the amplitude (in-phase and quadrature) of tap 1) |
| | Amplitude of a tap 2 in the first group of second bitmaps in the first bitmap | 16 bits | Amplitude of the tap 2 |
| | . . . | . . . | . . . |
| | Amplitude of a tap $M_1$ in the first group of second bitmaps in the first bitmap | 16 bits | Amplitude of the tap $M_1$ |
| | . . . | . . . | . . . |
| | Amplitude of the tap 1 (amplitude of tap 1) in the first group of second bitmaps in the first bitmap | 16 bits | Amplitude of the tap 1 (the amplitude (in-phase and quadrature) of tap 1) |
| | Amplitude of the tap 2 in the first group of second bitmaps in the first bitmap | 16 bits | Amplitude of the tap 2 |
| | . . . | . . . | . . . |
| | Amplitude of a tap $M_p$ in the first group of second bitmaps in the first bitmap | 16 bits | Amplitude of the tap $M_p$ |
| Tap phase (phase) in the sampling unit 1 | Phase of the tap 1 in the first group of second bitmaps in the first bitmap | 8 bits | Phase of the tap 1 |
| | Phase of the tap 2 in the first group of second bitmaps in the first bitmap | 8 bits | Phase of the tap 2 |
| | . . . | . . . | . . . |
| | Phase of the tap $M_1$ in the first group of second bitmaps in the first bitmap | 8 bits | Phase of the tap $M_1$ |
| | . . . | . . . | . . . |
| | Phase of the tap 1 in the first group of second bitmaps in the first bitmap | 8 bits | Phase of the tap 1 |
| | Phase of the tap 2 in the first group of second bitmaps in the first bitmap | 8 bits | Phase of the tap 2 |
| | . . . | . . . | . . . |
| | Phase of the tap $M_p$ in the first group of second bitmaps in the first bitmap | 8 bits | Phase of the tap $M_P$ |
| . . . | . . . | . . . | . . . |
| Tap amplitude (amplitude) in a sampling unit N_snapshot | Amplitude of the tap 1 (amplitude of tap 1) in the first group of second bitmaps in the first bitmap | 16 bits | Amplitude of the tap 1 (the amplitude (in-phase and quadrature) of tap 1) |
| | Amplitude of the tap 2 in the first group of second bitmaps in the first bitmap | 16 bits | Amplitude of the tap 2 |
| | . . . | . . . | . . . |

TABLE 13d-continued

| Subfield (subfield) | Size (size) | | Meaning (meaning) |
|---|---|---|---|
| | Amplitude of the tap $M_1$ in the first group of second bitmaps in the first bitmap | 16 bits | Amplitude of the tap $M_1$ |
| | . . . | . . . | . . . |
| | Amplitude of a tap 1 (amplitude of tap 1) in a $p^{th}$ group of second bitmaps in the first bitmap | 16 bits | Amplitude of the tap 1 (the amplitude (in-phase and quadrature) of tap 1) |
| | Amplitude of a tap 2 in the $p^{th}$ group of second bitmaps in the first bitmap | 16 bits | Amplitude of the tap 2 |
| | . . . | . . . | . . . |
| | Amplitude of a tap $M_p$ in the $p^{th}$ group of second bitmaps in the first bitmap | 16 bits | Amplitude of the tap $M_p$ |
| Tap phase (phase) in the sampling unit N_snapshot | Phase of the tap 1 in the $p^{th}$ group of second bitmaps in the first bitmap | 8 bits | Phase of the tap 1 relative to the reference path |
| | Phase of the tap 2 in the $p^{th}$ group of second bitmaps in the first bitmap | 8 bits | Phase of the tap 2 |
| | . . . | . . . | . . . |
| | Phase of the tap $M_1$ in the $p^{th}$ group of second bitmaps in the first bitmap | 8 bits | Phase of the tap $M_1$ |
| | . . . | . . . | . . . |
| | Phase of the tap 1 in the $p^{th}$ group of second bitmaps in the first bitmap | 8 bits | Phase of the tap 1 |
| | Phase of the tap 2 in the $p^{th}$ group of second bitmaps in the first bitmap | 8 bits | Phase of the tap 2 |
| | . . . | . . . | . . . |
| | Phase of the tap $M_P$ in the $p^{th}$ group of second bitmaps in the first bitmap | 8 bits | Phase of the tap $M_P$ |

A communication apparatus provided in embodiments of this application is described below.

In this application, the communication apparatus is divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in this application, module division is an example, and is merely a logical function division. During actual implementation, another division manner may be used. The following describes in detail the communication apparatuses in embodiments of this application with reference to FIG. 9 to FIG. 11.

Figure 9:
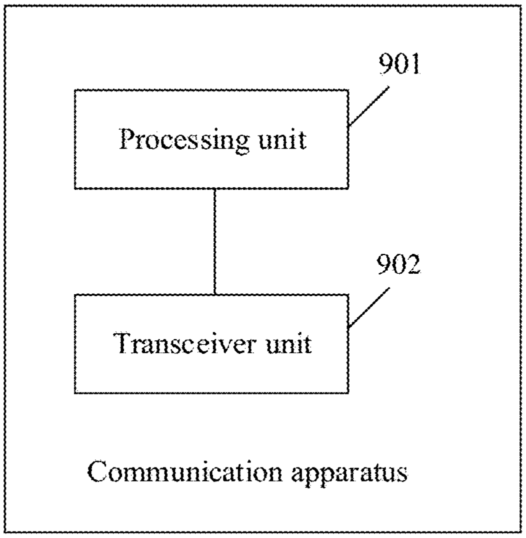
FIG. 9 is a diagram of a structure of a communication apparatus according to an embodiment of this application.

FIG. 9 is a diagram of a structure of a communication apparatus according to an embodiment of this application. As shown in FIG. 9, the communication apparatus includes a processing unit 901 and a transceiver unit 902.

In some embodiments of this application, the communication apparatus may be the transmitter or the chip shown above, and the chip may be applied to the transmitter. In other words, the communication apparatus may be configured to perform a operation or a function performed by the transmitter in the foregoing method embodiments.

The transceiver unit 902 is configured to output control information and input feedback information.

For example, the processing unit 901 is configured to: determine control information; and output the control information by using the transceiver unit 902, and input feedback information.

It may be understood that the processing unit 901 may further perform processing based on the feedback information to obtain information such as a speed, a distance, or attenuation of a target.

It may be understood that specific descriptions of the transceiver unit and the processing unit described in embodiments of this application are merely examples. For specific functions, operations, or the like of the transceiver unit and the processing unit, refer to the foregoing method embodiments. Details are not described herein.

FIG. 9 is reused. In some other embodiments of this application, the communication apparatus may be the receiver shown above, a chip in the receiver, or the like. In other words, the communication apparatus may be configured to perform a operation or a function performed by the receiver in the foregoing method embodiments.

For example, the transceiver unit 902 is configured to input control information, and the transceiver unit 902 is further configured to output feedback information.

For example, the processing unit 901 is configured to determine the feedback information based on the control information.

It may be understood that specific descriptions of the transceiver unit and the processing unit described in embodiments of this application are merely examples. For specific functions, operations, or the like of the transceiver unit and the processing unit, refer to the foregoing method embodiments. Details are not described herein.

In the foregoing embodiments, for descriptions of the control information, the feedback information, the first control information, the second control information, the first bitmap, the second bitmap, the reference sampling unit, and the like, refer to the descriptions in the foregoing method embodiments. Details are not described herein again.

The foregoing describes the transmitter and the receiver in embodiments of this application. The following describes possible product forms of the transmitter and the receiver. It should be understood that a product in any form that has the function of the transmitter in FIG. 9 or a product in any form that has the function of the receiver in FIG. 9 falls within the protection scope of embodiments of this application. It should be further understood that the following description is merely an example, and product forms of the transmitter and the receiver in embodiments of this application are not limited thereto.

In an embodiment, in the communication apparatus shown in FIG. 9, the processing unit 901 may be one or more processors. The transceiver unit 902 may be a transceiver, or the transceiver unit 902 may be a sending unit and a receiving unit. The sending unit may be a transmitter, and the receiving unit may be a receiver. The sending unit and the receiving unit are integrated into one component, for example, a transceiver. In embodiments of this application, the processor and the transceiver may be coupled, or the like. A manner of connecting the processor and the transceiver is not limited in embodiments of this application. When the foregoing method is performed, a process of sending information in the foregoing method may be understood as a process of outputting the foregoing information by the processor. When outputting the information, the processor outputs the information to the transceiver, so that the transceiver transmits the information. After the information is output by the processor, other processing may further need to be performed on the information before the information arrives at the transceiver. Similarly, a process of receiving information in the foregoing method may be understood as a process of receiving the input information by the processor. When the processor receives the input information, the transceiver receives the information, and inputs the information into the processor. Further, after the transceiver receives the foregoing information, other processing may need to be performed on the information before the information is input into the processor.

Figure 10:
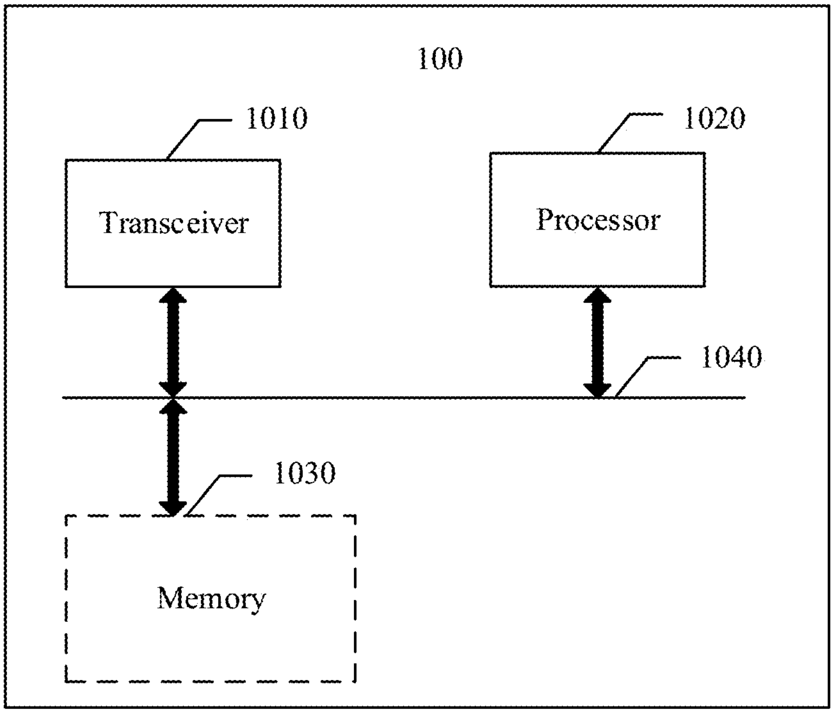
FIG. 10 is a diagram of a structure of a communication apparatus according to an embodiment of this application.

As shown in FIG. 10, a communication apparatus 100 includes one or more processors 1020 and a transceiver 1010.

For example, when the communication apparatus is configured to perform the operation, the method, or the function performed by the transmitter, the processor 1020 is configured to determine control information; and the transceiver 1010 is configured to: send the control information to the receiver, and receive feedback information from the receiver.

For example, when the communication apparatus is configured to perform the operation, the method, or the function performed by the receiver, the transceiver 1010 is configured to receive control information from the transmitter; the processor 1020 is configured to determine feedback information based on the control information; and the transceiver 1010 is further configured to send the feedback information to the transmitter.

In the foregoing embodiments, for descriptions of the control information, the feedback information, the first control information, the second control information, the first bitmap, the second bitmap, the reference sampling unit, and the like, refer to the descriptions in the foregoing method embodiments. Details are not described herein again.

In each implementation of the communication apparatus shown in FIG. 10, the transceiver may include a receiver and a transmitter. The receiver is configured to perform a receiving function (or operation), and the transmitter is configured to perform a transmitting function (or operation). In addition, the transceiver is configured to communicate with another device/apparatus through a transmission medium.

In an embodiment, the communication apparatus 100 may further include one or more memories 1030, configured to store program instructions, data, and/or the like. The memory 1030 is coupled to the processor 1020. The coupling in embodiments of this application may be an indirect coupling or a communication connection between apparatuses, units, or modules in an electrical form, a mechanical form, or another form, and is used for information exchange between the apparatuses, the units, or the modules. The processor 1020 may cooperate with the memory 1030. The processor 1020 may execute the program instructions stored in the memory 1030. In an embodiment, at least one of the one or more memories may be included in the processor.

In embodiments of this application, a specific connection medium between the transceiver 1010, the processor 1020, and the memory 1030 is not limited. In embodiments of this application, the memory 1030, the processor 1020, and the transceiver 1010 are connected through a bus 1040 in FIG. 10. The bus is represented by a bold line in FIG. 10. A connection manner of other components is merely an example for description and is not limited thereto. The bus may be classified into an address bus, a data bus, a control bus, and the like. For ease of representation, only one thick line is for representing the bus in FIG. 10, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, a discrete hardware component, or the like. The processor can implement or execute the methods, the operations, and the logical block diagrams disclosed in embodiments of this application. The general-purpose processor may be a microprocessor or any conventional processor or the like. The operations of the methods disclosed in combination with embodiments of this application may be directly implemented by a hardware processor, or may be implemented by using a combination of hardware and software modules in the processor, or the like.

In embodiments of this application, the memory may include but is not limited to a nonvolatile memory like a hard disk drive (HDD) or a solid-state drive (SSD), a random access memory (RAM), an erasable programmable read-only memory (EPROM), a read-only memory (ROM), or a portable read-only memory (CD-ROM). The memory is any storage medium that can be used to carry or store program code in a form of an instruction or a data structure and that can be read and/or written by a computer (for example, the communication apparatus shown in this application). However, this application is not limited thereto. The memory in embodiments of this application may alternatively be a circuit or any other apparatus that can implement a storage function, and is configured to store the program instructions and/or the data. For example, for the receiver, the memory may store reference information, that is, a sensing measurement result in a sampling unit. In an embodiment, for the transmitter, because the transmitter needs to parse CIR parameter information based on the reference information, the memory of the transmitter may also store the reference information.

For example, the processor 1020 is mainly configured to process a communication protocol and communication data, control the entire communication apparatus, execute a software program, and process data of the software program. The memory 1030 is mainly configured to store the software program and the data. The transceiver 1010 may include a control circuit and an antenna. The control circuit is mainly configured to perform conversion between a baseband signal and a radio frequency signal and process the radio frequency signal. The antenna is mainly configured to receive and send a radio frequency signal in a form of an electromagnetic wave. An input/output apparatus, for example, a touchscreen, a display, or a keyboard, is mainly configured to: receive data input by a user and output data to the user.

After the communication apparatus is powered on, the processor 1020 may read the software program in the memory 1030, interpret and execute instructions of the software program, and process the data of the software program. When data needs to be sent wirelessly, the processor 1020 performs baseband processing on the to-be-sent data, and then outputs a baseband signal to a radio frequency circuit. The radio frequency circuit performs radio frequency processing on the baseband signal, and then sends a radio frequency signal in a form of electromagnetic wave through the antenna. When data is sent to the communication apparatus, the radio frequency circuit receives a radio frequency signal through the antenna, converts the radio frequency signal into a baseband signal, and outputs the baseband signal to the processor 1020. The processor 1020 converts the baseband signal into data, and processes the data.

In another implementation, the radio frequency circuit and the antenna may be disposed independent of the processor that performs baseband processing. For example, in a distributed scenario, the radio frequency circuit and the antenna may be remotely disposed independent of the communication apparatus.

It may be understood that the communication apparatus described in embodiments of this application may further have more components than those in FIG. 10, and the like. This is not limited in embodiments of this application. The foregoing methods performed by the processor and the transceiver are merely examples. For specific operations performed by the processor and the transceiver, refer to the methods described above.

Figure 11:
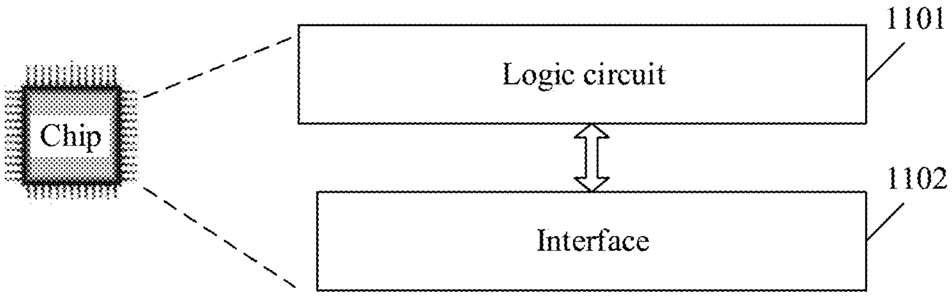
FIG. 11 is a diagram of a structure of a communication apparatus according to an embodiment of this application.

In another possible implementation, in the communication apparatus shown in FIG. 9, the processing unit 901 may be one or more logic circuits. The transceiver unit 902 may be an input/output interface that is also referred to as a communication interface, an interface circuit, an interface, or the like. Alternatively, the transceiver unit 902 may be a sending unit and a receiving unit. The sending unit may be an output interface, and the receiving unit may be an input interface. The sending unit and the receiving unit are integrated into one unit, for example, an input/output interface. As shown in FIG. 11, the communication apparatus shown in FIG. 11 includes a logic circuit 1101 and an interface 1102. In other words, the processing unit 901 may be implemented by using the logic circuit 1101, and the transceiver unit 902 may be implemented by using the interface 1102. The logic circuit 1101 may be a chip, a processing circuit, an integrated circuit, a system on chip (SoC) chip, or the like. The interface 1102 may be a communication interface, an input/output interface, a pin, or the like. For example, FIG. 11 shows an example in which the communication apparatus is a chip. The chip includes the logic circuit 1101 and the interface 1102. It may be understood that the chip shown in embodiments of this application may include a narrowband chip, an ultra-bandwidth chip, or the like. This is not limited in embodiments of this application. The operation of sending the sensing packet shown above may be performed by the ultra-bandwidth chip, and whether the remaining operations are performed by the ultra-bandwidth chip is not limited in embodiments of this application.

In embodiments of this application, the logic circuit and the interface may be coupled to each other. A specific manner of connecting the logical circuit and the interface is not limited in embodiments of this application.

For example, when the communication apparatus is configured to perform the method, the function, or the operation performed by the transmitter, the logic circuit 1101 is configured to determine control information; and the interface 1102 is configured to output the control information and input feedback information. The logic circuit 1101 is further configured to process the feedback information to obtain information related to a target.

For example, when the communication apparatus is configured to perform the method, the function, or the operation performed by the receiver, the interface 1102 is configured to input control information; the logic circuit 1101 is configured to determine feedback information based on the control information; and the interface 1102 is further configured to output the feedback information.

It may be understood that the communication apparatus shown in embodiments of this application may implement the method provided in embodiments of this application in a form of hardware, or may implement the method provided in embodiments of this application in a form of software. This is not limited in embodiments of this application.

In the foregoing embodiments, for descriptions of the control information, the feedback information, the first control information, the second control information, the first bitmap, the second bitmap, the reference sampling unit, and the like, refer to the descriptions in the foregoing method embodiments. Details are not described herein again.

For specific implementations of embodiments shown in FIG. 11, refer to the foregoing embodiments. Details are not described herein again.

An embodiment of this application further provides a wireless communication system. The wireless communication system includes a transmitter and a receiver. The transmitter and the receiver may be configured to perform the method in any one of the foregoing embodiments (as shown in FIG. 3).

In addition, this application further provides a computer program. The computer program is used to implement operations and/or processing performed by the transmitter in the method provided in this application.

This application further provides a computer program. The computer program is used to implement operations and/or processing performed by the receiver in the method provided in this application.

This application further provides a computer-readable storage medium. The computer-readable storage medium stores computer code. When the computer code is run on a computer, the computer is enabled to perform operations and/or processing performed by the transmitter in the method provided in this application.

This application further provides a computer-readable storage medium. The computer-readable storage medium stores computer code. When the computer code is run on a computer, the computer is enabled to perform operations and/or processing performed by the receiver in the method provided in this application.

This application further provides a computer program product. The computer program product includes computer code or a computer program. When the computer code or the computer program is run on a computer, operations and/or processing performed by the transmitter in the method provided in this application are/is performed.

This application further provides a computer program product. The computer program product includes computer code or a computer program. When the computer code or the computer program is run on a computer, operations and/or processing performed by the receiver in the method provided in this application are/is performed.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on an actual requirement to implement the technical effect of the solutions provided in embodiments of this application.

In addition, function units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technologies, or all or some of the technical solutions may be implemented in a form of a software product. The computer software product is stored in a readable storage medium and includes a plurality of instructions for instructing a computer device (which may be a personal computer, a server, or a network device) to perform all or some of the operations of the methods described in embodiments of this application. The foregoing readable storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for feeding back a sensing measurement result in a wireless network, wherein the method comprises:

sending control information, wherein the control information comprises first control information, and the first control information indicates to feed back a sensing measurement result in a bitmap mode, wherein the first control information comprises information indicating a length of a bitmap and position information of a corresponding sampling point; and receiving feedback information, wherein the feedback information comprises channel impulsive response (CIR) parameter information, and the CIR parameter information is obtained by processing the sensing measurement result based on the control information.

2. The method according to claim 1, wherein the first control information comprises information about a first threshold, and the first threshold indicates to process the sensing measurement result based on the first threshold.

3. The method according to claim 1, wherein the first control information further comprises information about a compression mode, and the compression mode comprises any one of the following: no compression, a first compression mode in which a fixed quantity of sampling points are used as a unit, and a second compression mode in which a variable quantity of sampling points are used as a unit.

4. The method according to claim 1, wherein the position information of the corresponding sampling point comprises a reference path and an offset of a start position of the sampling point relative to the reference path.

5. The method according to claim 1, wherein the feedback information comprises a first bitmap, and each bit in the first bitmap indicates whether to feed back a sensing measurement result in a corresponding group.

6. The method according to claim 5, wherein the feedback information further comprises a second bitmap, and each bit in the second bitmap indicates whether to feed back a sensing measurement result of a sampling point in the corresponding group.

7. The method according to claim 5, wherein the feedback information further comprises information related to the CIR parameter information, and the information related to the CIR parameter information comprises at least one of the following:

a quantity of sampling units corresponding to the CIR parameter information, a quantity of sampling points comprised in each sampling unit, a quantity of antennas used for measuring the sensing measurement result, and information indicating whether a sensing measurement result in a reference sampling unit is stored.

8. A communication apparatus, comprising a processor and a memory, wherein the memory is configured to store instructions; and the processor is configured to execute the instructions, for performing:

sending control information, wherein the control information comprises first control information, and the first control information indicates to feed back a sensing measurement result in a bitmap mode, wherein the first control information comprises information indicating a length of a bitmap and position information of a corresponding sampling point; and receiving feedback information, wherein the feedback information comprises channel impulsive response (CIR) parameter information, and the CIR parameter information is obtained by processing the sensing measurement result based on the control information.

9. The apparatus according to claim 8, wherein the first control information comprises information about a first threshold, and the first threshold indicates to process the sensing measurement result based on the first threshold.

10. The apparatus according to claim 8, wherein the first control information further comprises information about a compression mode, and the compression mode comprises any one of the following: no compression, a first compression mode in which a fixed quantity of sampling points are used as a unit, and a second compression mode in which a variable quantity of sampling points are used as a unit.

11. The apparatus according to claim 8, wherein the position information of the corresponding sampling point comprises a reference path and an offset of a start position of the sampling point relative to the reference path.

12. The apparatus according to claim 8, wherein the feedback information comprises a first bitmap, and each bit in the first bitmap indicates whether to feed back a sensing measurement result in a corresponding group.

13. The apparatus according to claim 12, wherein the feedback information further comprises a second bitmap, and each bit in the second bitmap indicates whether to feed back a sensing measurement result of a sampling point in the corresponding group.

14. The apparatus according to claim 12, wherein the feedback information further comprises information related to the CIR parameter information, and the information related to the CIR parameter information comprises at least one of the following:

a quantity of sampling units corresponding to the CIR parameter information, a quantity of sampling points comprised in each sampling unit, a quantity of antennas used for measuring the sensing measurement result, and information indicating whether a sensing measurement result in a reference sampling unit is stored.

15. A non-transitory computer-readable storage medium, wherein the computer-readable storage medium stores a computer program, and when the computer program is executed by a computer, the computer is configured to perform operations comprising:

sending control information, wherein the control information comprises first control information, and the first control information indicates to feed back a sensing measurement result in a bitmap mode, wherein the first control information comprises information indicating a length of a bitmap and position information of a corresponding sampling point; and receiving feedback information, wherein the feedback information comprises channel impulsive response (CIR) parameter information, and the CIR parameter information is obtained by processing the sensing measurement result based on the control information.

16. The non-transitory computer-readable storage medium according to claim 15, wherein the first control information comprises information about a first threshold, and the first threshold indicates to process the sensing measurement result based on the first threshold.

17. The non-transitory computer-readable storage medium according to claim 15 wherein the first control information further comprises information about a compression mode, and the compression mode comprises any one of the following: no compression, a first compression mode in which a fixed quantity of sampling points are used as a unit, and a second compression mode in which a variable quantity of sampling points are used as a unit.

18. The non-transitory computer-readable storage medium according to claim 15, wherein the position information of the corresponding sampling point comprises a reference path and an offset of a start position of the sampling point relative to the reference path.

* * * * *